United States Patent [19]

Kim

[11] Patent Number: 4,964,125
[45] Date of Patent: Oct. 16, 1990

[54] METHOD AND APPARATUS FOR DIAGNOSING FAULTS

[75] Inventor: Sachol E. Kim, Yorba Linda, Calif.

[73] Assignee: Hughes Aircraft Company, Los Angeles, Calif.

[21] Appl. No.: 234,434

[22] Filed: Aug. 19, 1988

[51] Int. Cl.$^5$ ............................................. G06F 11/00
[52] U.S. Cl. .................................. 371/15.1; 364/513; 371/29.1
[58] Field of Search ............... 364/200, 900, 513, 579; 371/20.1, 24, 26, 11.3, 11.1, 15.1, 29.1

[56] References Cited

U.S. PATENT DOCUMENTS

| 205,873 | 12/1986 | Ashford et al. | |
|---|---|---|---|
| 4,649,515 | 3/1987 | Thompson et al. | 364/900 |
| 4,803,040 | 2/1989 | Gross | 364/513 |
| 4,817,092 | 3/1989 | Denny | 371/11.3 |
| 4,847,795 | 7/1989 | Baker | 364/579 |
| 4,849,879 | 7/1989 | Chinnaswamy | 364/513 |

OTHER PUBLICATIONS

Proceedings of the National Conference on Artificial Intelligence, Aug. 1982, M. R. Genesereth: "Diagnosis Using Hierarchical Design Models", pp. 278–283, see p. 278, left-hand column, lines 1–38; p. 278, right-hand column, lines 18–45; p. 279, right-hand column, line 4, p. 280, right-hand column.
Proceedings of the Second Conference on Artificial Intelligence Applications, 11–13 Dec. 1985, Miami Beach (Florida, US), CAIA 1985, IEEE, D. L. Larner: "A recursive Expert Troubleshooting System Utilizing General and Specific Knowledge", pp. 34–41, see p. 37, left-hand column, line 21, p. 40, left-hand column, line 2; p. 40, left-hand column, line 54, right-hand column, line 18.
Proceedings of the National Conference on Artificial Intelligence, Aug. 1982, R. Davis et al.: "Diagnosis Based on Description of Structure and Function", pp. 137–142, see the whole article.
Expert Systems, vol. 3, no. 2, Apr. 1986, (Oxford, GB), L. F. Pau: "Survey of Expert Systems for Fault Detection, Test Generation, and Maintenance", pp. 100–111, see p. 100, left-hand column, line 1, right-hand column, line 48; p. 103, left-hand column, lines 1–18; p. 104, right-hand column, line 10, p. 108, right-hand column, line 26.
Electronic Design, vol. 34, no. 8, 3 Apr. 1986 (Hasbrouck Heights, New Jersey, US), C. Kalme: "A Tool Applies the Art of Building Expert Systems to Troubleshooting Boards", pp. 159–162, 164,166, see p. 160, left-hand column, line 8, p. 161, left-hand column, line 20.
Proceedings of the Fourth Conference on Artificial Intelligence Applications, 14–18 Mar. 1988, San Diego (CA, US), CAIA 1988, IEEE, D. Liu: "The Hiclass Software System: a Manufacturing Expert System Shell", pp. 256–261, see p. 258, right-hand column, lines 32–47; p. 260, right-hand column, figure.
M. R. Genesereth, "Diagnosis Using Heirarchical Design Models", Proceedings of the National Conference on Artificial Intelligence, Aug. 1982, pp. 278–283.
D. L. Larner, "A Recursive Expert Troubleshooting System Utilizing General and Specific Knowledge", Proceedings of the Second Conference on Artificial Intelligence Applications, pp. 34–41.

Primary Examiner—Michael R. Fleming
Attorney, Agent, or Firm—Wanda K. Denson-Low

[57] ABSTRACT

The present invention is directed to an expert system for diagnosing faults. The system comprises a knowledge base containing information regarding a conceptual model of the equipment under diagnosis. The system also comprises an inference engine for generating a set of symptom diagnostic rules from the information contained within the knowledge base in conjunction with user-generated inputs.

35 Claims, 18 Drawing Sheets

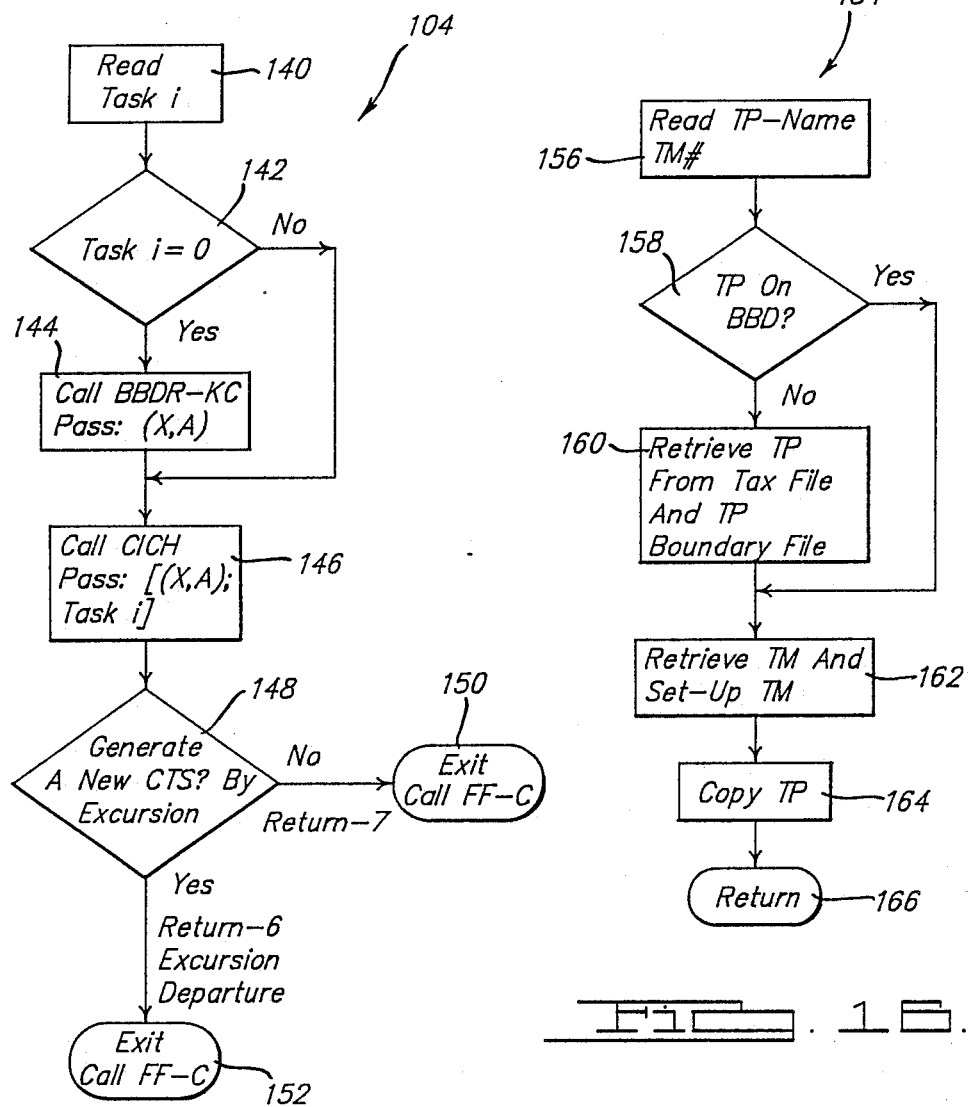

METHOD AND APPARATUS FOR DIAGNOSING FAULTS

BACKGROUND OF THE INVENTION

1. Field of the Invention

The present invention relates to the field of expert systems, and more particularly to an expert system and method for diagnosing faults in equipment.

2. Description of Related Art

Knowledge systems such as expert systems are computer systems that emulate reasoning tasks used by human experts. Such knowledge systems typically use an "inference engine" to interpret encoded knowledge of human experts which is stored in a "knowledge base." If the domain of the knowledge base or scope of the problem is sufficiently narrow, and a sufficiently large body of the knowledge is properly coded in the knowledge base, then the expert system can achieve performance matching or exceeding the ability of a human expert.

Previous attempts to build such expert systems have been based upon a symptom diagnostic rules approach. The essence of this approach is as follows. For every symptom, initial or intermediary, there should correspond an ultimate or intermediary cause. An explicit procedure that leads to a correlation of a symptom to its cause is called a symptom diagnostic rule. These diagnostic rules may be manipulated by a "rule firing" inference engine as follows. Suppose symptom X is exhibited by a given piece of equipment. The inference engine searches for a diagnostic rule in the collection of such rules which forms the knowledge base. If there is a rule that corresponds to the symptom, then we take the prescribed action Y. If the equipment is restored to normal operation by taking the action Y, the troubleshooting process is completed. If the ultimate cause is not found after the action Y was taken, then a new symptom $X^1$ is generated. The inference engine then looks for another rule that corresponds to symptom $X^1$.

While such expert systems have generally been found useful in the diagnosis of electronic equipment, such systems often had at least one significant disadvantage involving the process for constructing the diagnostic rules. It is almost impossible to anticipate all or even most of the possible symptoms of complex electronic systems and to identify all possible causes for the symptoms. It is also very difficult to develop the correlation procedures between the diagnostic rules. Accordingly, the chief disadvantage of using prior art expert systems to perform diagnosis on electronic equipment is the necessity of constructing the system diagnostic rules.

SUMMARY OF THE INVENTION

According to the preferred embodiment of the present invention, an expert system is disclosed which diagnoses faults in equipment. The expert system comprises a knowledge base containing information regarding a model of the equipment. Further, the expert system comprises an inference engine which generates a set of symptom diagnostic rules from the information contained in the knowledge base in conjunction with user inputs. The expert system is able to generate information which allows the user of the system to correct faults in the equipment.

BRIEF DESCRIPTION OF THE DRAWINGS

The advantages of the present invention will become apparent to one skilled in the art upon reading the following specification with reference to the accompanying drawing, in which:

FIG. 15 is a flow chart representing the find fault routine used by the inference engine;

FIG. 16 is a flow chart representing the blackboarder-taxonomy routine used by the inference engine;

DETAILED DESCRIPTION

Figure 1:
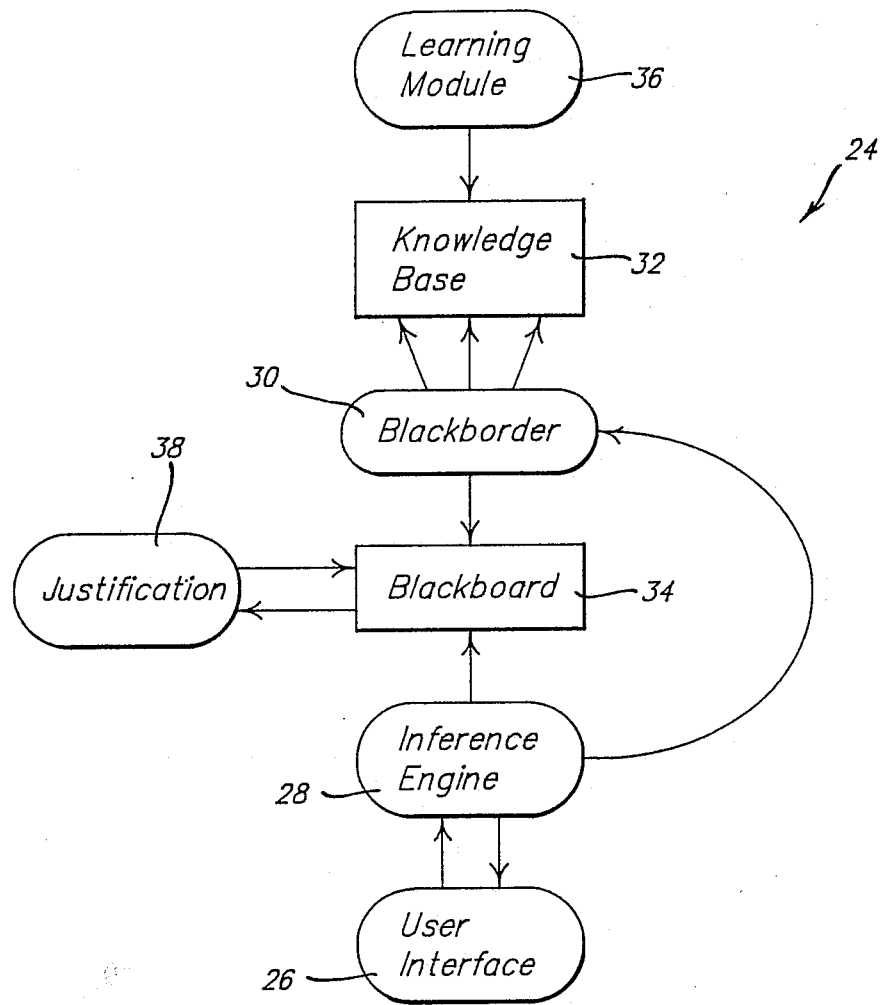
FIG. 1 is a block diagram of an expert system according to a preferred embodiment of the present invention.

An expert system in accordance with the present invention and generally designated by numeral 24 is shown in FIG. 1. While the expert system 24 may be used for diagnosing faults in electronic equipment, for example, it may also be used for diagnosis in other environments such as medical, mechanical or electromechanical systems, or the like, and hence is not limited to electronic equipment.

The expert system is implemented in a microcomputer which interacts with a user that is preferably familiar with the equipment upon which diagnosis is to be performed. The microcomputer is a general purpose computer and has a central unit including a microprocessor and a random access memory along with one or more floppy disk drives for receiving computer programs and data to be executed and processed.

To permit the user to interact with the expert system, the microcomputer includes a cathode-ray tube display for displaying results and prompting the user for data to be entered via a keyboard. To provide a permanent record for listing of the data when the expert system is in operation, a printer may be provided which is electrically connected to the microcomputer.

The system 24 includes a learning module 36, which is used to gather information from the user regarding the design and operation of the equipment. A user interface 26, which may comprise a keyboard, is provided which allows the user to enter a symptom exhibited by the equipment into the system 24.

The user interface 26 communicates with an inference engine 28, which is a reasoning mechanism that diagnoses malfunctions in the equipment using a determinant or conceptual model of the equipment. As more fully described below, the determinant is used to indicate to the inference engine 28 how the equipment is designed, built and is to be maintained. When the user inputs a given symptom into the system by way of the user interface 26, the inference engine 28 generates an appropriate symptom diagnostic rule which is indicative of the fault. Accordingly, while most expert systems require that symptom diagnostic rules be developed by a knowledge engineer and stored in the knowledge base, the present expert system 24 generates the symptom diagnostic rules.

Given a symptom, the inference engine 28 requests information necessary to perform its diagnosis by way of a blackboarder routine 30. The blackboarder routine 30 is used to access information contained in a knowledge base 32 and composes the information retrieved from the knowledge base 32 on a blackboard 34. To permit the user 12 to locate errors in the knowledge base 32, the system 24 further comprises a justification routine 38. If the system 24 misdiagnoses a particular fault in the equipment, the justification routine 38 permits the user to ask the system 24 to justify the results of its diagnosis. In this way, the user may eliminate errors present in the knowledge base 32.

Based on the information retrieved by the blackboarder routine 30, the inference engine 28 attempts to isolate the fault. If the fault is isolated, the inference engine 28 indicates to the user that the fault has been isolated and the session is terminated. The user may then use the information obtained from the system 24 to correct the fault in the equipment. If the inference engine 28 is not able to diagnose the fault, it then determines which test should be performed on the equipment and asks the user to perform the test.

If the inference engine 28 does not isolate the fault, it may encounter an infinite loop if it repeatedly examines the same knowledge. The possibility that an infinite loop may occur is minimized, however, since approximately half the fault domain of the equipment is eliminated each time the inference engine 28 conducts a new test. On the other hand, if the inference engine 28 encounters a previously tested location, the system 24 terminates its fault diagnosis, and alerts the user that more information about a certain area of the equipment 24 is needed by generating an ignorance message.

The components of the expert system 24 have been described above in general terms to permit an understanding of the operation thereof. The knowledge base 32 and the inference engine 28 will now be described in greater detail.

1. KNOWLEDGE BASE 32

The knowledge base 32 of the expert system 24 will be described from three perspectives: its epistemology; the manner in which information is represented; and the manner in which information is stored.

1.1 Epistemology of the Knowledge Base 32

The domain problems in conventional rule-based expert systems are generally the set of all malfunctions that occur in the domain (i.e., the equipment). Each malfunction that occurs in the domain exhibits a set of symptoms so that the domain problem can be resolved if there is a procedure that correlates a given symptom with a particular cause. This type of approach is called a symptom diagnostic rules approach. Accordingly, a domain problem can be resolved if there is a symptom diagnostic rule for every symptom.

Rather than representing knowledge by symptom diagnostic rules, the knowledge base 32 of the present expert system 24 contains two different types of information: that which represents how the equipment is designed, built and is to be maintained; and information indicating whether or not the equipment is operating normally. With these two types of knowledge, the symptom diagnostic rules for most symptoms can be deduced by the inference engine 28. By using this approach, the need for creating large sets of symptom diagnostic rules for storage in the knowledge base 32 is eliminated.

The two types of knowledge described above are contained in sixteen files which comprise the knowledge base 32. Of these sixteen files, two contain objective knowledge relating to information about the physical architecture or anatomy (static view) of the equipment. Objective knowledge consists of specific "devices" and "wires" that link the devices. These two objective knowledge files are contained in a physical device file and a wire list file.

The remaining fourteen files are generally categorized as generated knowledge. Generated knowledge may be classified into three categories. The first category includes information regarding the "dynamic view" of the equipment and consists of a set of specified functions and the relationships among the functions. The dynamic view of the equipment focuses on its functional aspects.

The second type of generated knowledge includes information regarding the "substrates" of the equipment. The equipment may be divided into specific portions which perform a specified function. The portion of the equipment at which the specified function F is performed is termed the substrate F and is denoted by S(F). Accordingly, S(F) correlates the dynamic view of the equipment with its static view.

The third category of generated knowledge includes information covering the normality criteria of the equipment. Once a function F is specified and its substrate S(F) identified, a measurable criteria is needed to allow the system 24 to ascertain whether the substrate S(F) is performing its specified function F correctly. This measurable criteria is referred to as the normality criteria.

The sixteen specific files of the knowledge base 32 are more completely described below.

Taxonomy File: Each defined function which the equipment performs is termed a "knowledge cell" and each knowledge cell has a set of outputs. A downlink (DL) is defined as the carrier of the knowledge cell outputs and is typically a set of wires. The graph formed by the interconnections between knowledge cells and downlinks is called the determinant or system taxonomy of the equipment. A portion of the determinant is a taxonomical piece (TP). Knowledge cells and downlinks must be generated through interpretations of the design documents associated with the equipment as described below. For each taxonomical piece, the taxonomy file contains the name of each knowledge cell, the cell's downlinks, the number of levelers (as defined below) for each composite cell, and the cell type.

Leveler File: A knowledge cell may be decomposable into smaller knowledge cells which reflect a function and its subfunctions. A knowledge cell that can be decomposed is a "composite" knowledge cell, while one which is not decomposable is a "simple" knowledge cell. The leveler file contains the information regarding the decomposition of composite knowledge cells, including the composite cell, the name of the determinant piece, and the name of the root cell of the determinant piece which is the entry point for the composite cell.

Boundary File: Each taxonomical piece contains boundary cells formed from portions of the determinant. The boundary file contains a listing of knowledge cells which are also boundary cells.

Level Jump Conditions (LJC) File: A taxonomical piece is a subset of knowledge cells connected with downlinks and comprises a relatively large number of substrates. The level jump condition file contains a test procedure which the user normally follows to test the substrates collectively (i.e., to determine whether a fault cell exists within the taxonomical piece).

Enablement Conditions File: In order for a substrate S(F) to perform its assigned function F, the substrate S(F) may have a set of conditions that must be satisfied for proper operation. For example, the substrate S(F) may have clock synchronization, voltage or ambient temperature requirements which must be satisfied for the substrate S(F) to operate properly. The enablement conditions file contains information regarding the existence of such conditions for a given knowledge cell.

Maintenance Action File: Even though a substrate S(F) may not contain a fault and all enablement conditions are met, the substrate S(F) still may not perform its assigned function F. The reasons for this may not be deducible from the design documentation alone, in that the problem may be due to the interaction of a complex set of factors which are encountered through experience. For instance, these problems may include intermittent problems, marginal problems, alignment problems or problems caused by abrupt atmospheric or ambient disturbances. The existence of these factors are stored in the maintenance action file. In addition, if there is any known symptom diagnostic rules for the substrate S(F), they are easily incorporated into the knowledge base as maintenance actions in the maintenance action file.

Downlink (DL) File: The downlink file contains information regarding the outputs of each knowledge cell. There are two types of downlinks. One is a set of physical wires which are called the wire links. The other is called a logical link, whose outputs may be probed or inspected on a substrate other than the currently probed substrate.

Test Message (TM) File: For each taxonomical piece which does not contain faulty knowledge cells, a test message is generated which indicates the test procedure that is to be performed on that piece. The test message file is used to store outputs of all the knowledge cells in the taxonomical piece.

Normal Operational State Values (NOSV) File: The normal outputs along the wire links of a knowledge cell with respect to a given test message are called normal operational state values (NOSV) of the knowledge cell. The values are stored in the normal operational state values file.

Logical State Values File: While the NOSV file contains normal operational state values for wire links, the logical state values file contains normal operational state values of the logical links, such as conditions of surfaces determined through visual inspection, oily surfaces, and displayed information resulting from test message inputs.

Special Probe/Inspection Procedure File: The special probe/inspection procedure file is used to probe or inspect normal operating state values for each knowledge cell, including special equipment and procedures.

Determinant Directory File: As more fully described below, knowledge is represented in the knowledge base in the form of a determinant model. For convenience, the determinant may be cut into many pieces called determinant pieces (DP). The determinant directory is used to inform the inference engine 28 how to proceed from one determinant piece to another. Each determinant piece is uniquely defined by its name, the name of the taxonomical piece with which it is associated, and the pointers or keys to the portions of the level jump conditions file and the test message file associated with the particular taxonomical piece.

GLCH Override File: The GLCH override file contains information that overrides the diagnostic routine performed by the inference engine 28 on a particular knowledge cell to another knowledge cell which is more likely to contain the fault based on knowledge engineering experience and inputs. The GLCH override file may be used to indicate that the inference engine should examine one particular knowledge cell if another particular knowledge cell is encountered.

CICH Override File: The CICH override file contains information that overrides the reasoning process of the inference engine 28 as it troubleshoots within a given knowledge cell. The CICH override file allows the user to instruct the inference engine 28 to look for a particular fault when a certain knowledge cell is determined to be faulty.

Physical Device File: The physical device file contains information regarding the architecture of the equipment (i.e., the devices forming the equipment), including the names of the components which correspond to the hardware nodes of the tree graph structure, including card names, display, frame attach devices such as track balls, and memory, for example.

Wire List File: The wire list file contains information regarding the wires which interconnect the components of the equipment. The physical devices and wire list files together describe the physical characteristics of the hardware comprising the equipment.

1.2 Representation of Knowledge in the Knowledge Base 32

The knowledge contained in the knowledge base 32 is information from which the static view, dynamic view, and correlation therebetween, as well as the normality thereof, can be constructed. However, this knowledge must be understood by the inference engine 28. To allow the inference engine 28 to understand the information, it is represented as a "determinant", which represents a conceptual model of the equipment.

The determinant is abstractly represented as a graph consisting of nodes and edges. The nodes represent knowledge cells which contain knowledge useful for the inference engine 28 at a given point during diagnosis. Each knowledge cell may comprise, but is not limited to the following knowledge elements: (1) abstract operator label (i.e., the name of the knowledge cell); (2) cell reference (function definition, F); (3) physical device (substrate reference S(F)); (4) enablement condition of the substrate; (5) maintenance actions of the substrate; (6) downlink; (7) uplink - the downlink of other knowledge cells whose outputs come into this knowledge cell; (8) wire list associated with the substrate S(F); (9) normal operating state values; (10) logical state values; (11) special probe and inspection procedures; (12) leveler; (13) level jump condition; (14) test message; (15) CICH override; (16) GLCH override; and (17) cell type.

Each knowledge cell may comprise one of six different types. A blank cell is a knowledge cell that has no substrate but is used to group knowledge cells into categories to facilitate entry into the knowledge base 32 and to establish root cells described below. A regular cell is a knowledge cell that has a substrate S(F). A simple cell is a regular knowledge cell that cannot be decomposed, while a composite cell is a regular knowledge cell that may be decomposed. A logical cell is a regular knowledge cell that receives no outputs of any other regular cell, while a boundary cell is a regular knowledge cell which is a boundary of a taxonomical piece (i.e., it connects two or more taxonomical pieces). Each knowledge cell is constructed to have unique downlink, and two knowledge cells that have the same inputs are called associates.

Figure 2:
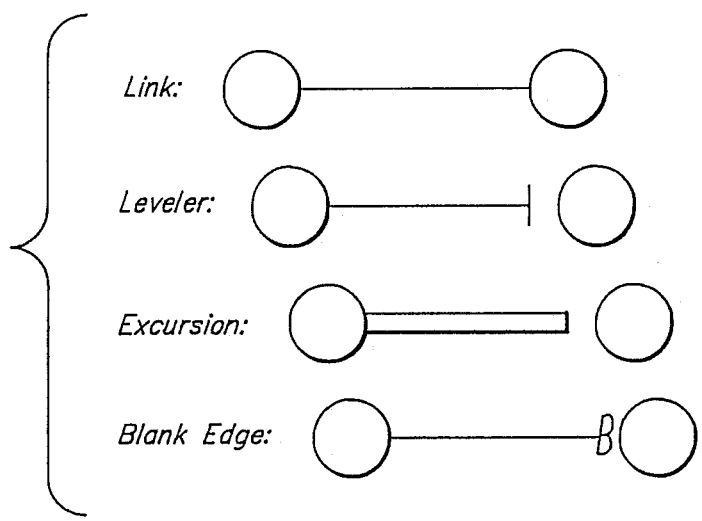
FIG. 2 is a diagram illustrating the connectors representing edges, forming the determinant of the present invention, which connectors are used in FIGS. 3-5.

There are four different connectors which are used as edges in forming the determinant. These are shown in FIG. 2. A link connector represents the circumstance where a regular cell sends its output to a regular cell. A leveler connector represents the condition where a composite cell is decomposable into a taxonomical piece consisting of other knowledge cells. An excursion connector is used to indicate that a given knowledge cell must be referred to in order to troubleshoot the substrate of a knowledge cell to which it originates. A blank edge is used to connect blank cells and therefore has no physical meaning. These four different types of connectors are utilized in FIGS. 3-5.

Figure 3:
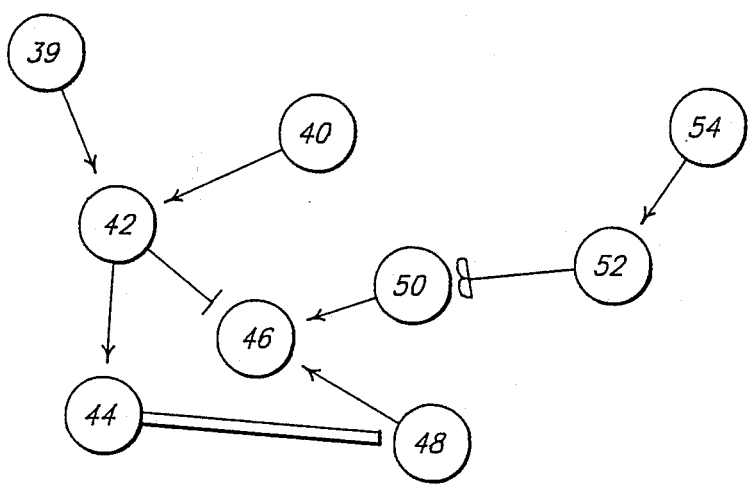
FIG. 3 is a graphical representation of knowledge elements stored in the knowledge base of the system of FIG. 1.

By representing knowledge elements as nodes and by using link, leveler, excursion, and blank edge connectors, the determinant of the equipment may be depicted graphically. A portion of one such graph is shown in FIG. 3. In this graph, knowledge cells 39 and 40 are connected by links to knowledge cell 42. The knowledge cell 42 in turn connected to knowledge cell 44 by a link, as well as to knowledge cell 46 by a leveler. Knowledge cell 48 is connected to the knowledge cell 46 by a link, while the knowledge cell 44 is connected to the knowledge cell 48 by an excursion. Knowledge cell 50 is connected to knowledge cell 46 by a link, while the knowledge cell 54 is connected to knowledge cell 50 by a blank edge. Finally, knowledge cell 54 is connected to the knowledge cell 52 by a link. By graphically representing the functional portions of the equipment in this manner, the functional interrelationship of its components may be characterized before being stored in the knowledge base 32.

Figure 4:
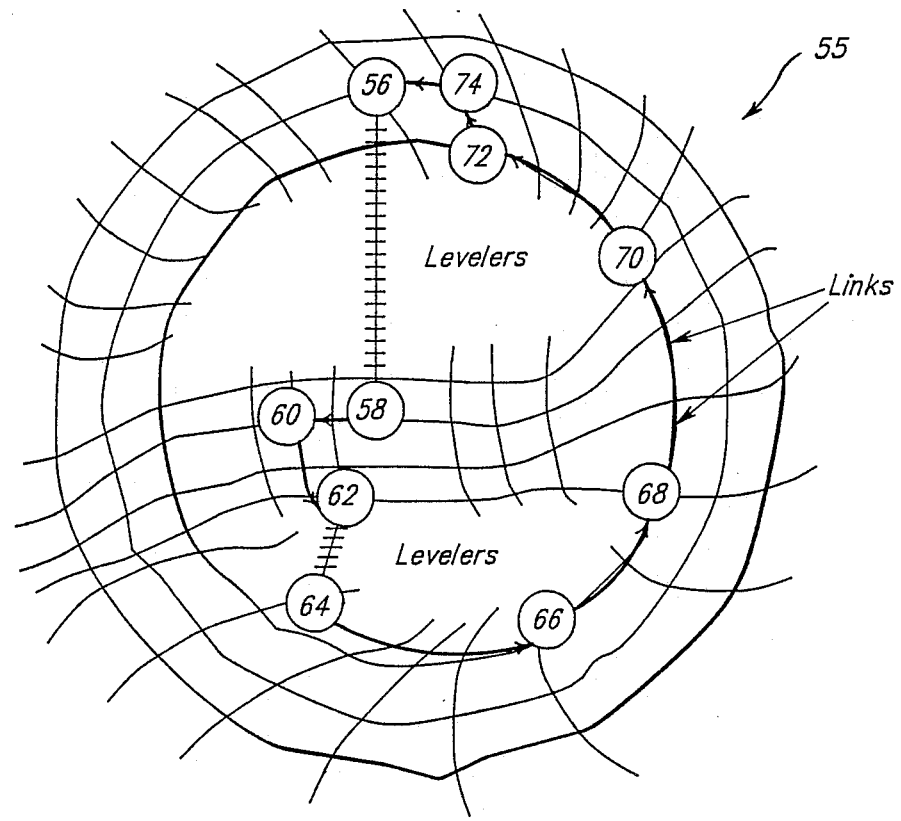
FIG. 4 is an illustration of a determinant which represents the knowledge about the equipment upon which diagnosis is to be performed.

An entire determinant representing the equipment may be represented as a lattice Klein surface as shown in FIG. 4. In FIG. 4, determinant 55 has knowledge cells 56-70. Knowledge cell 56 is connected to knowledge cell 58 by a leveler, while knowledge cell 58 is connected to knowledge cell 60 through a link. Knowledge cell 60 is connected to knowledge cell 62 through a link, while knowledge cell 64 is connected to knowledge cell 62 through a leveler. Knowledge cell 64 is connected to the knowledge cell 66 through a link, and knowledge cell 66 is in turn connected to knowledge cell 68 through a link. Knowledge cell 68 is connected to knowledge cell 70 through a link, while knowledge cell 70 is connected to knowledge cell 72 through a link. Finally, knowledge cell 72 is connected to knowledge cell 74 through a link, which is in turn connected to knowledge cell 56 through a link.

It will be apparent from FIG. 4 that knowledge cells 56 and 58 are on different levels since they are connected by a leveler. Accordingly, knowledge cell 56 may be decomposed into knowledge cells 58-62. In physical terms, this means that the component of the equipment represented by knowledge cell 56 is functionally dependent on three subcomponents represented by knowledge cells 58-62. By comparison, knowledge cell 56 is also connected to knowledge cell 64 through links via knowledge cells 66-74, which means that knowledge cell 56 is not functionally dependent on knowledge cell 64.

Figure 5A:
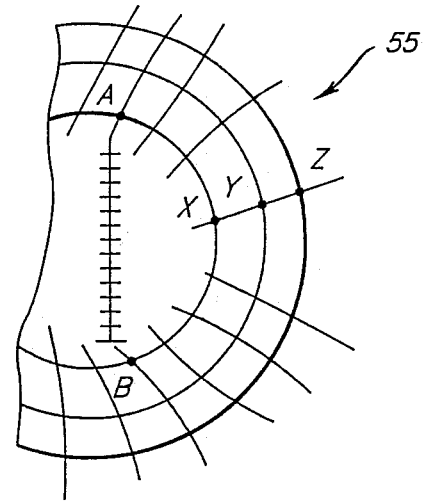
FIGS. 5a-c are illustrations representing a normalization process which is applied to the determinant shown in FIG. 4.
Figure 5B:
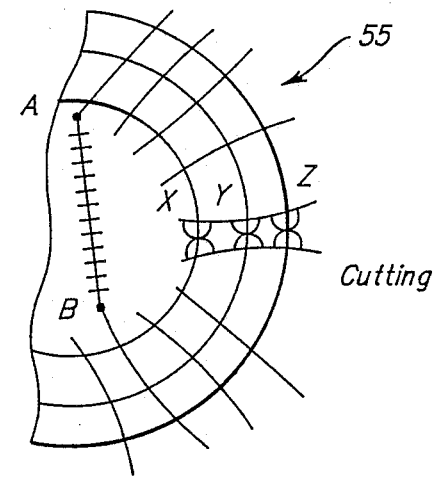
Figure 5C:
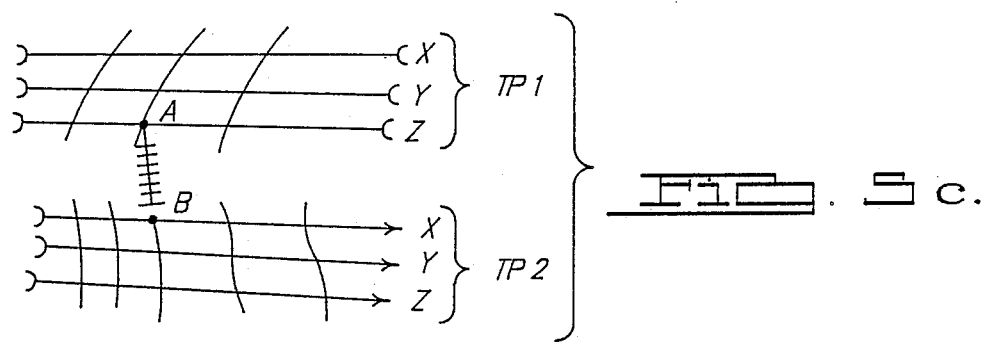

To minimize the time required for processing information regarding diagnosis of the equipment, the determinant 55 is normalized in the manner shown in FIGS. 5a-c. In FIG. 4a, knowledge cells A and B are on the same level on one path since they are connected by links through knowledge cell X. However, knowledge cell B is also at a lower level than knowledge cell A on a second path since knowledge cells A and B are also connected by a leveler. As shown in FIG. 5b, it is possible to cut the determinant 55 along knowledge cells X, Y and Z to form two taxonomical pieces TP 1 and TP 2, as shown in FIG. 5c. In the normalized graph shown in FIG. 4c, knowledge cell B is always at a lower level than knowledge cell A since it is no longer connected to knowledge cell A by a link through knowledge cell X.

Through this normalization process, the determinant 55 may be represented as a group of taxonomical pieces with all knowledge cells within a particular taxonomical piece connected by links. Each of the taxonomical pieces which comprise the determinant 55 are connected by levelers. The normalization process of the determinant 55 allows the determinant to be represented in such a way as to permit the knowledge system 24 to locate a fault in the equipment without examining each knowledge cell. In addition, by normalizing the determinant, the control over the inference engine 28 during diagnosis is somewhat easier as illustrated below.

1.3 Knowledge Engineering Requirements Regarding the Knowledge Base 32

To store information regarding the equipment in the knowledge base 32, there are three tasks which must be performed. First, the types of knowledge regarding the equipment which are needed for diagnosis must be determined. Secondly, the knowledge must be acquired from equipment documentation. Finally, the knowledge acquired from the documentation must be represented as a determinant in the manner described above. The results of these three steps may be transcribed to a set of data sheets, which data may then be entered into the knowledge base 32.

Figure 6:
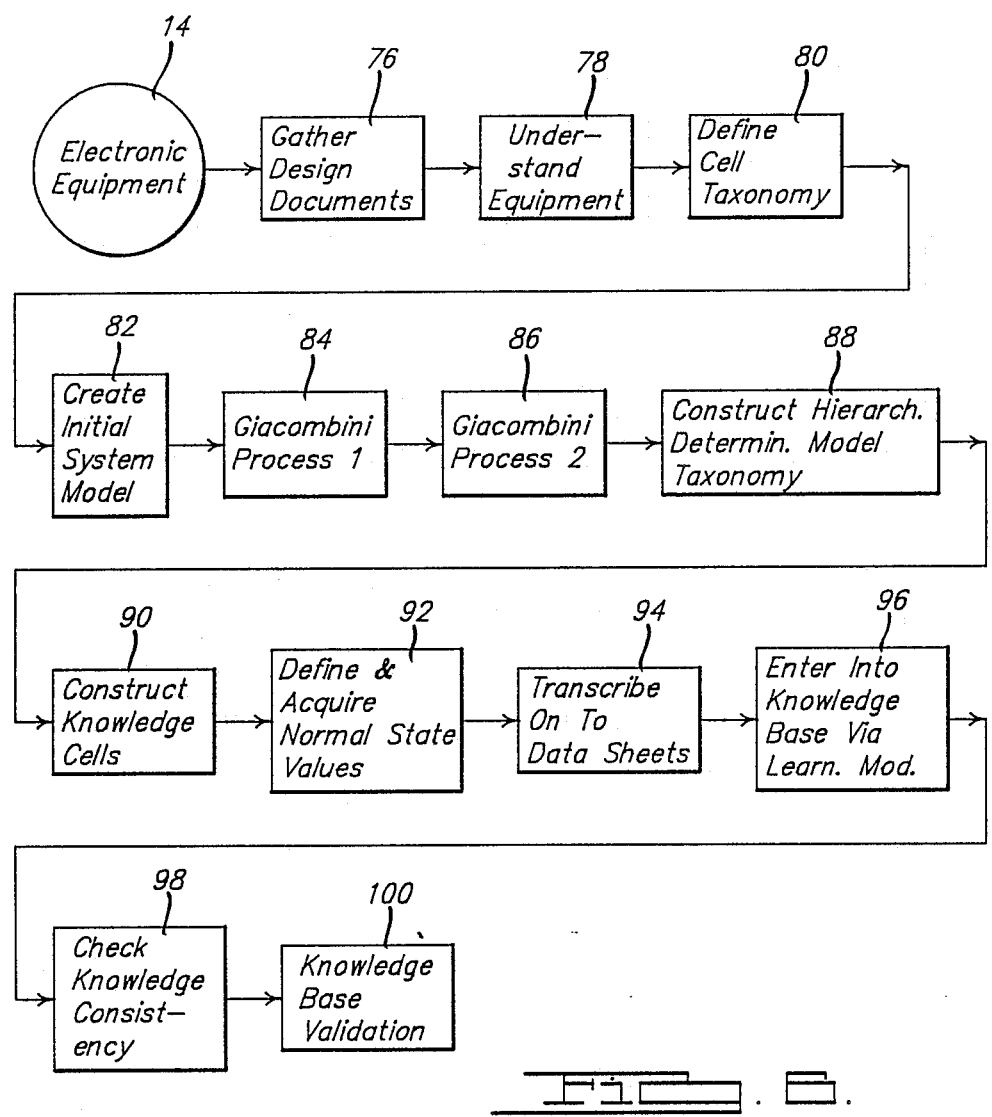
FIG. 6 is an illustration representing the procedure for collecting and storing information in the knowledge base shown in FIG. 1.
Figure 7:
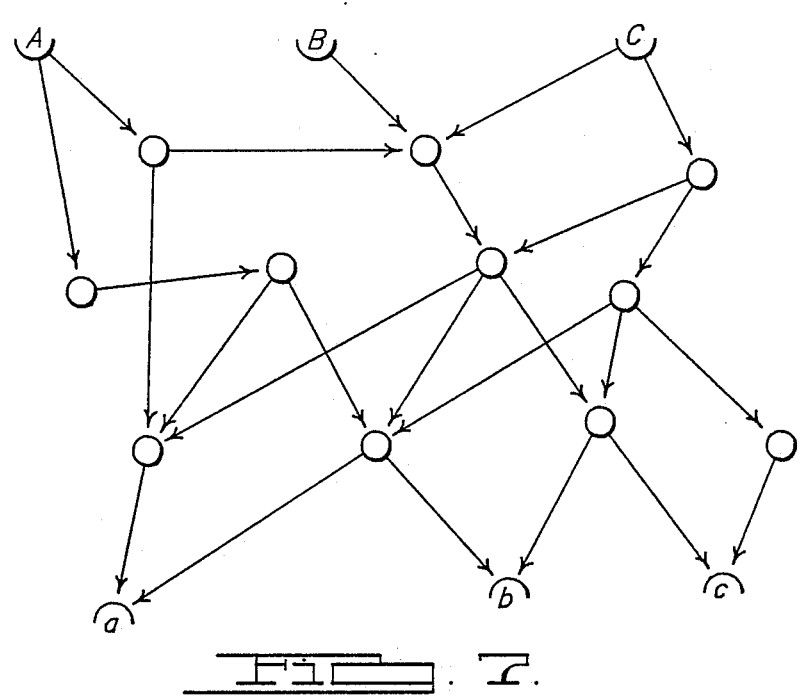
FIG. 7 is an illustration representing an initial state model of the information to be stored in the knowledge base shown in FIG. 1.

The specific sequence of tasks which must be performed to place the relevant knowledge in the knowledge base 32 is shown in FIG. 6. At steps 76 and 78, the user gathers design documentation regarding the equipment and obtains an understanding of the way the equipment operates. At step 80, the taxonomy of the knowledge cell is defined in that the functional components of the equipment are assigned to knowledge cells and the links between different knowledge cells are located. At step 82, an initial system model of the equipment is formed using the knowledge cells and links formed in step 80. An example of an initial system model is shown in FIG. 7. The half circles which are on the periphery of FIG. 7 are the boundary cells which are external to the system or subsystems on a consideration. The boundary cells A, B, and C whose outputs go into the intermediate system model are called in-boundary cells while boundary cells a, b, and c are called out-boundary cells in that their outputs go out of the intermediate system model.

Referring again to FIG. 6, in step 84, Giacombini process 1 is performed in which out-boundary cells are allowed to fuse into a single blank cell so as to become a root of a tree graph. As discussed above, a blank cell is an abstract cell which does not represent any specific function. By fusing the out-boundary cells of FIG. 7, FIG. 7 is transformed into the graph shown in FIG. 8. Knowledge cells $B_1$ and $C_1$, which appear in FIG. 8 represent the associates of knowledge cells B and C respectively in that they have the same inputs.

Figure 8:
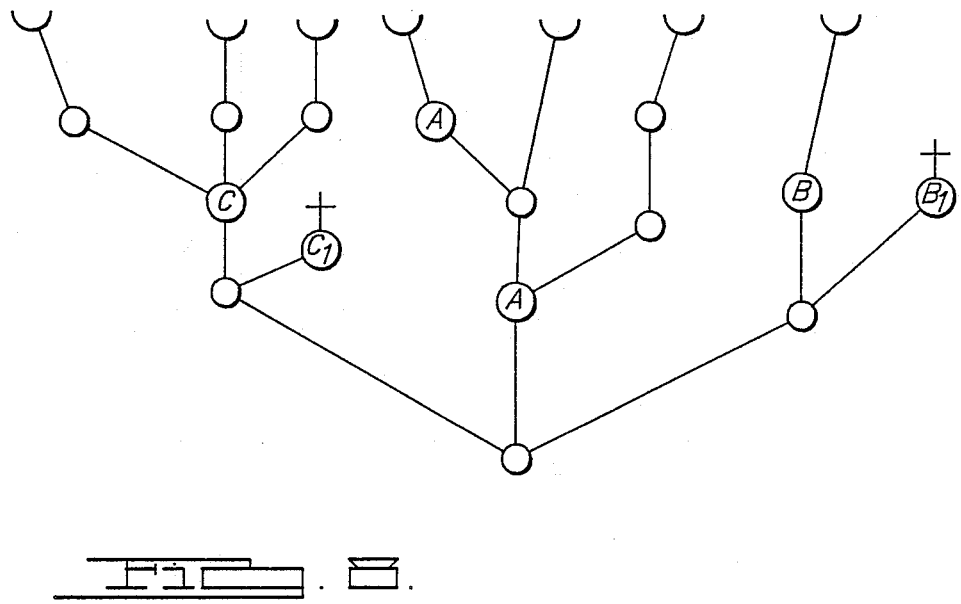
FIG. 8 is an illustration representing the transformation of the initial state model shown in FIG. 7 which occurs by fusing out-boundary cells.
Figure 9:
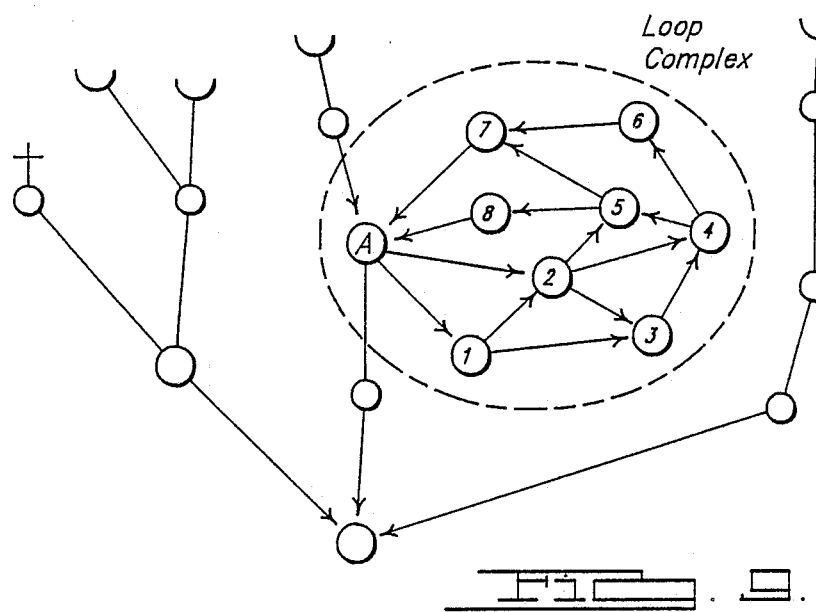
FIG. 9 is an illustration representing a tree graph of loops shown in FIG. 8.
Figure 10:
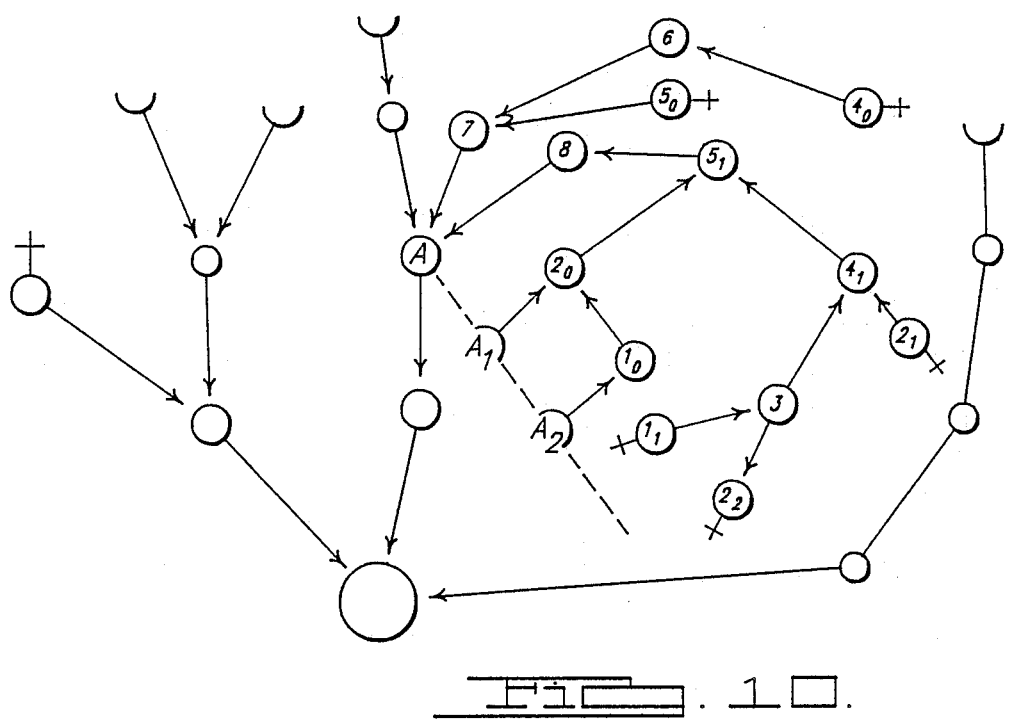
FIG. 10 is an illustration representing a Giacombini process which is applied to the tree graph shown in FIG. 9.
Figure 11:
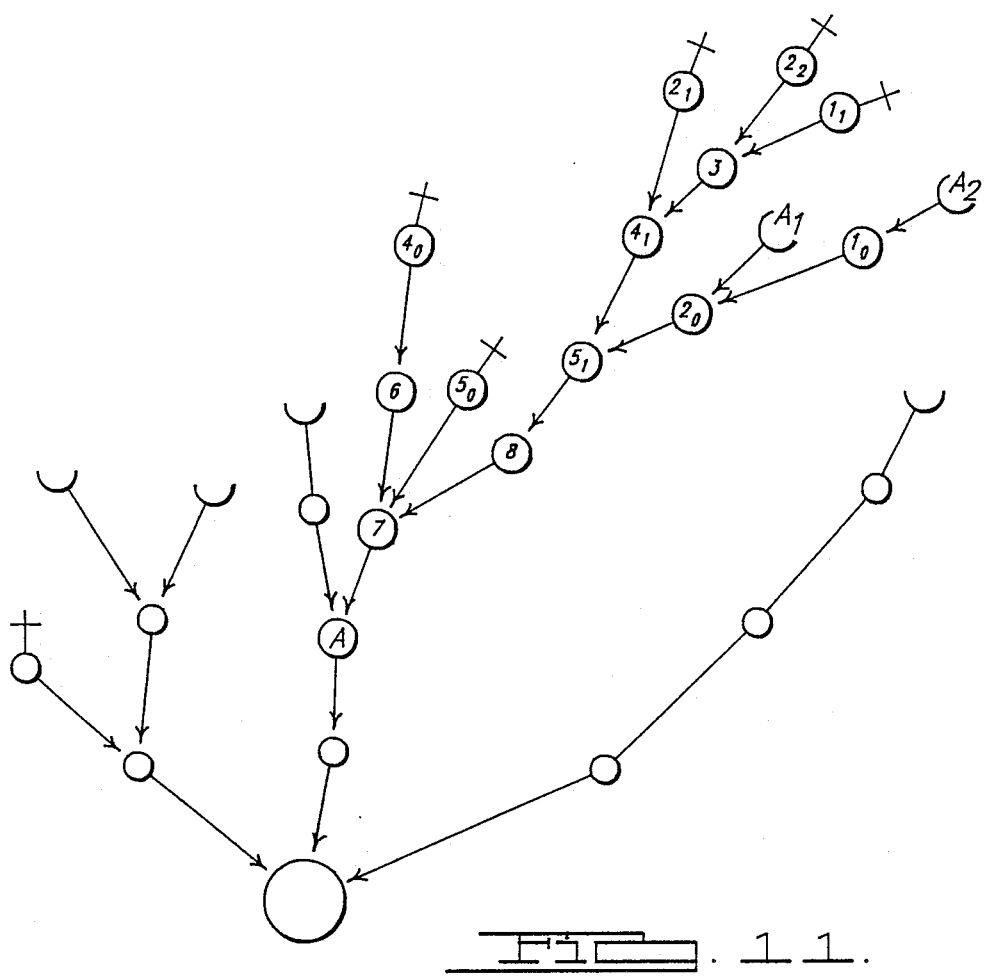
FIG. 11 is a tree representation of the determinant of the equipment.

As shown in FIG. 8, knowledge cell A appears twice on the same branch which indicates that a loop exists. Once all the loops in the transformed initial system model are detected, loops are graphically recreated on a tree graph as shown in FIG. 9. Giacombini process 2 is then performed on the discovered loops by introducing associate cells ($1_0$, $1_1$), ($2_0$, $2_1$, $2_2$), ($4_0$, $4_1$) and ($5_0$, $5_1$) in the manner shown in FIG. 10. After transposing the graph along the line connecting the associate cells as shown in FIG. 10, the final nonhierarchical representation of the determinant is obtained as shown in FIG. 11.

Figure 12:
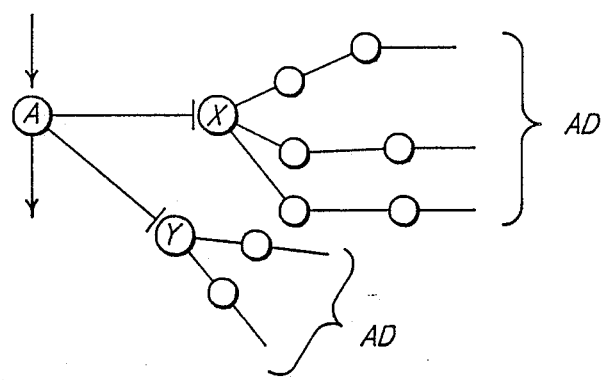
FIG. 12 is an illustration representing a portion of the hierarchical taxonomy of a determinant of the equipment.

Referring again to FIG. 6, at step 88, a hierarchical or normalized determinant is formed in the manner as shown in FIG. 12. Assume knowledge cell A represents a specific function and assume there exists a group of subfunctions within knowledge cell A which forms the determinant piece AD. If knowledge cell X represents the ROOT cell (i.e., the root of the tree graph representing the determinant) of the determinant piece AD, then a leveler exists between knowledge cell A and knowledge cell X. Examining other knowledge cells in the same manner, each function of the equipment is decomposed into subfunctions to form a set of determinant pieces which are connected by levelers.

At steps 90 and 92, knowledge cells are connected and normal state values are defined and acquired. In this step, each knowledge cell that appears in the determinant model is assigned the types of knowledge described above. At steps 94 and 96, the determinant, together with the information collected in steps 90 and 92, are transcribed into formatted data sheets and inputted through learning module 36 into the knowledge base 32. At steps 98 and 100, the "goodness" of the knowledge base 32 is determined hierarchically by using three criteria. The first criterion is the analytical truth of the information contained in the knowledge base 32. To determine the analytical truth of the information, the knowledge base 32 is examined by a knowledge consistency checker within the learning module 36 to determine whether there are any logical contradictions.

The knowledge base 32 is then examined to determine whether the analytical truth corresponds to reality. This is done by determining the synthetic truth of the knowledge base 32. The synthetic truth is established to the extent that a set of selected faults inserted into the equipment are correctly isolated. For those selected faults which are not correctly fault isolated, a revision of the knowledge base 32 is performed.

The third goodness criteria against which the knowledge base 32 is tested is completeness. Completeness means that the knowledge base 32 has a complete knowledge about the manner in which the electronic equipment 32 is designed to work. The degree of completeness is determined by the frequency of ignorance or inability of the system 24 to isolate a fault. After the completeness of the knowledge base 32 has reached a level acceptable to the user (for example, 99 fault isolations out of 100 attempts), the knowledge base 32 may be used in conjunction with the inference engine 28 to perform diagnosis.

2. INFERENCE ENGINE 28

Before discussing the specific operation of the inference engine 28, several terms shall be defined. The first is the term "cyber". Since the determinant of the equipment is represented as a collection of taxonomical pieces, a given knowledge cell A must be in some taxonomical piece X. Accordingly, the location of a knowledge cell may be represented as the ordered pair (X,A), where A represents the name of the knowledge cell and X represents the name of the taxonomical piece containing the knowledge cell A. The ordered pair (X,A) is referred to as a cyber. Accordingly, if f is a fault that is caused by an equipment malfunction, f must lie in some cyber (X,A). A cyber (X,A) which contains a fault f is called a "fault cell," and the knowledge cell associated with the cyber is called a faulty knowledge cell.

As more fully discussed below, the inference engine 28 examines a sequence of cybers in locating a fault in the equipment. The specific sequence of cybers which the inference engine 28 examines is called the cyber transition sequence. In general, the inference engine 28 generates a cyber transition sequence according to one of the following rules: (1) the inference engine 28 chooses a cyber (X,B) such that the taxonomical piece X is bisected so that approximately one half of the cybers which do not contain fault cells in the taxonomical piece can be deleted from further consideration; (2) if a cyber (Y,B) is a boundary of the taxonomical piece Y, then the taxonomical piece Y which is connected to the taxonomical piece X is entered and then the inference engine 28 moves to cyber (Y,B); (3) if the knowledge cell A of the cyber (X,A) is a composite knowledge cell, then the inference engine 28 "levels down" to a taxonomical piece Y and then chooses a cyber (Y,B) such that the taxonomical piece Y can be bisected, or (4) the inference engine 28 may directly jump to any cyber (Y,B) if told to do so by means of the GLCH Override described below.

If the inference engine 28 finds a fault cell indicating a faulty knowledge cell A while examining the cybers in the cyber transition sequence, then the inference engine 28 locates the fault in that particular knowledge cell A. Accordingly, the control of the inference engine 28 either ends at a fault cell if the fault cell contains a fault, or it constructs another cyber transition sequence. The sequence in moving from one fault cell to a cyber transition sequence of another fault cell is called a fault-transition sequence.

Before the flow charts associated with the inference engine 28 are described, a general description of the behavior of the inference engine 28 during fault diagnosis will be presented. Assume that the equipment malfunctions and the cause of the malfunction is the fault F. Then the normality criteria of the cyber in the determinant must be violated. If the fault cell of the taxonomical piece (X,A) is found, the fault F must reside either in the underlying physical device (i.e., the substrate S(A)), in its enablement conditions, in its maintenance discipline (i.e., maintenance actions), or in the wires associated with the substrate S(A) (i.e., open or pinched).

Accordingly, the inference engine 28 can adopt either one of four possible behaviors. The inference engine 28 can find a fault cell indicating that the cyber transition sequence is finite. This condition is represented by a GLCH-Success signal. Alternatively, the inference engine 28 may not be able to find a fault cell indicating that the cyber transition sequence forms a loop and is therefore infinite. When the inference engine 28 cannot find a fault cell, the inference engine 28 terminates diagnosis with the statement to the user that the inference engine 28 is executing an infinite loop. In doing so, the system 24 lists all the cybers in the loop as well as prints out an error in the system taxonomy and the taxonomical pieces involved. The occurrence of this condition is indicated by a GLCH-Failure signal.

Further, the inference engine 28 may find a fault in the fault cell, indicated by a CICH-Success signal, or it may not find a fault in all fault cells in the taxonomy indicated by a CICH-Failure signal. When the inference engine 28 cannot find a failure in all fault cells, it terminates the diagnosis and informs the user that the knowledge cell associated with the cyber (X,A) has insufficient knowledge and that additional knowledge is needed. Accordingly, the inference engine 28 is able to determine what it does not know.

The inference engine 28 contains six logical components. The first logical component is the global control heuristic ("GLCH"). The global control heuristic generates the cyber transition sequences, and finds a fault cell or terminates diagnosis indicating that the system 24 is ignorant as to the specific type of failure. The second logical component is the blackboarder-taxonomy routine ("BBDR-TAX"). Because the global control heuristic acts only on the determinant and not on the knowledge base 32 directly, the blackboarder-taxonomy routine accesses the knowledge base 32 and constructs a taxonomical piece of the determinant upon which the global control heuristic acts. The third logical component is the blackboarder-knowledge cell routine ("BBDR-KC") which is used to retrieve the various knowledge types which are associated with a particular knowledge cell. These include uplinks, downlinks, the normal operating state values and so forth.

The fourth logical component is the cell internal control heuristic ("CICH") which acts on the knowledge cell that the blackboarder-knowledge cell routine has constructed. The cell internal control heuristic isolates a fault in the knowledge cell or decomposes the knowledge cell if the cell is a composite. The cell internal control heuristic then calls the global control heuristic to restart a separate cyber transition sequence or cause the diagnosis to exit with a cell knowledge deficiency statement.

The fifth logical component, the leveler-instruction routine (LEV-INS), tells the blackboarder-taxonomy cell routine what portion of the knowledge base 32 to retrieve and causes the construction of a determinant piece upon which the global control heuristic and the cell internal control heuristic act. Although the leveler-in-struction routine, blackboarder-taxonomy and blackboarder-knowledge cell routines form part of the blackboarder 30, they will be discussed in conjunction with the inference engine 28 for purposes of simplicity.

Finally, the goodness propagation routine ("GP") is used to allow quick location of fault cells. As the global control heuristic generates cybers in the cyber transition sequence, the domain of the search in the taxonomical piece is cut approximately in half. In order to locate fault cells in the determinant, it is necessary to know which half of the determinant contains the fault cell and which half does not. Accordingly, the goodness propagation routine extracts a maximum of information from a "single probe" to propagate "goodness" to a maximum number of yet untested knowledge cells which the inference engine 28 will not have to examine during diagnosis. The goodness propagation routine will be discussed below in conjunction with the global control heuristic.

Figure 13:
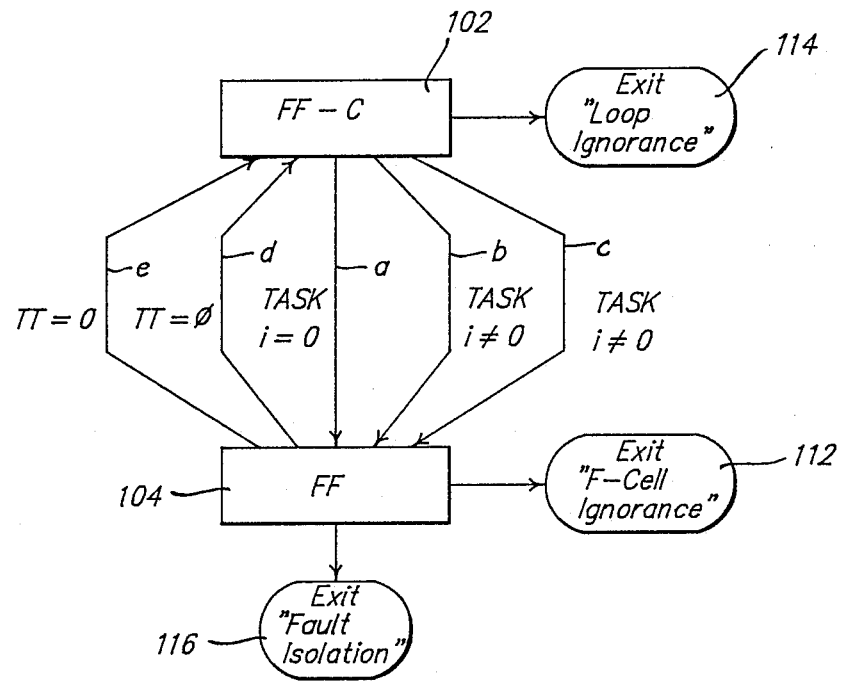
FIG. 13 is a flow chart representing the inference engine shown in FIG. 1.

A block diagram of the inference engine 28 is shown in FIG. 13. The inference engine 28 comprises a find fault cell routine ("FF-C") 102 and a find fault routine ("FF") 104. The find fault cell routine 102 is used to generate the cyber transition sequence which terminates with a cyber having the name of a fault cell. The find fault routine 104 is then used to isolate the fault within the fault cell. During operation, if the find fault cell routine 102 locates a fault cell, the processing flows along path "a" to the find fault routine 104 with the value of task i equal to zero. When the task i equals zero, the find fault routine 104 is instructed to check for each possible fault starting from the initial task (i.e., the find fault routine 104 will examine the downlinks, uplinks, enablement conditions and so forth to determine whether the equipment is exhibiting these particular faults). If it is determined that the knowledge cell under consideration is in fact a composite knowledge cell, the find fault cell routine 102 is instructed to level down to another taxonomical piece. This is done by the generation of a TT=0 output by the find fault routine 104 which is delivered to the find fault cell routine 102 along path "d". If it is determined that the fault of the current knowledge cell is due to another cyber, the find fault cell routine 102 is instructed to generate another cyber transition sequence beginning from another knowledge cell. This is done by generation of a TT=0 output by the find fault routine 104 which is delivered to the find fault cell routine 102 along path "e".

If a fault cell is not located, the find fault routine 104 is instructed to search task i other than task i=0 which is done through path "b". If the find fault cell routine 102 is instructed to search for a fault cell in a particular taxonomical piece and that taxonomical piece does not contain a fault cell, this information is returned to the find fault routine 104 through path "c" which sets task i unequal to 0. This allows the find fault routine 104 to terminate the diagnostic session with an "F-cell ignorance" message indicating that the system 24 does not contain information regarding the fault cell. This is shown in FIG. 13 at step 112. Further, if it is determined that all knowledge cells have been searched without locating the fault cell, the diagnostic session terminates with a "loop ignorance" message as shown in step 114. If the find fault routine 104 is able to locate the fault within a particular fault cell, this fact is displayed to the user at step 116.

Figure 14:
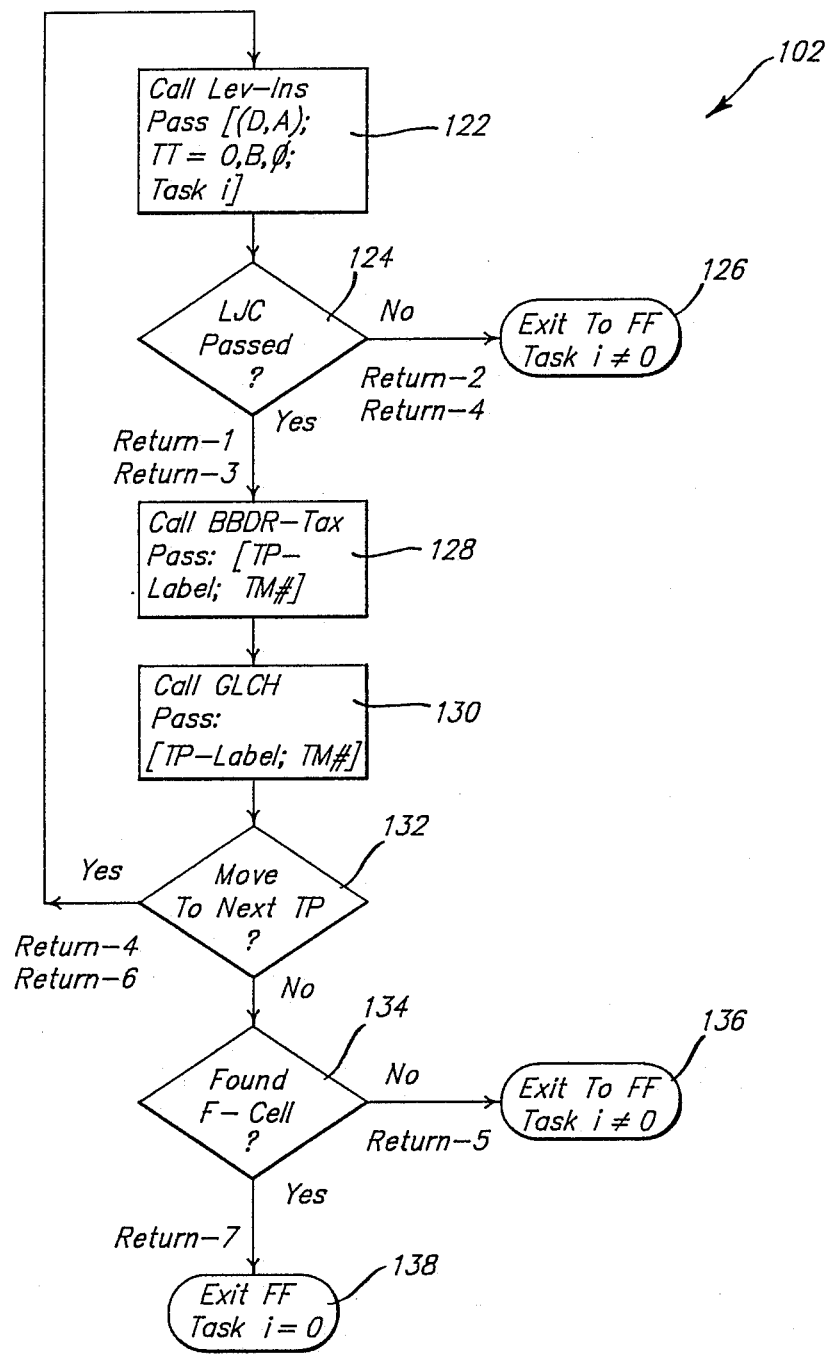
FIG. 14 is a flow chart illustrating the find fault cell routine used by the inference engine.

A more complete description of the find fault cell routine 102 will now be made with reference to FIG. 14. The find fault cell routine 102 starts at step 122 which calls the leveler-instruction routine described below to obtain the identification of the taxonomical piece if the next cyber in the cyber transition sequence is located. In doing so, the routine passes information to the leveler-instruction routine at step 122 regarding the identification of the present determinant piece D, the present knowledge cell A, whether the find fault cell routine 102 was accessed by the find fault routine 104 in either an override condition (TT=0), through a boundary cell (TT=B), or by levelling down to another taxonomical piece (TT=0). Finally, the routine also passes information to the leveler-instruction routine at step 122 regarding the task i which is being presently examined.

At step 124 it is determined whether or not the taxonomical piece under consideration contains a fault cell. This is done by examining the contents of the level jump conditions file. If the taxonomical piece under consideration does not contain a fault cell, control is passed to the find fault routine 104 at step 126.

If at step 124, it is determined that the taxonomical piece under consideration contains a fault cell, step 128 is executed, and the blackboarder-taxonomy routine is accessed. As described below, the blackboarder-taxonomy routine accesses the taxonomy file, the boundary file, and the test message file of the knowledge base 32 and uses this information to construct a determinant piece on the blackboard 34. In executing step 128, the find fault cell routine 102 passes information to the blackboarder-taxonomy cell routine regarding the label of the taxonomical piece under consideration, as well as the test message number associated with the taxonomical piece.

After executing step 128, step 130 is executed which calls the global control heuristic which in turn searches for a fault cell until it finds the taxonomical piece containing the fault cell or passes through boundary cells into a new taxonomical piece. In executing step 130, information is passed to the global control heuristic regarding the label of the current taxonomical piece, and the test message number of the taxonomical piece.

At step 132, it is determined whether it is necessary to move to a new taxonomical piece to locate the fault cell. If a new taxonomical piece must be examined to find the fault cell, step 122 is executed as described above. If at step 132, it is determined that it is not necessary to move to another taxonomical piece, step 134 is executed which determines whether the fault cell has been located. If the fault cell has not been located, the inference engine 28 then executes the find fault routine 104 by way of the step 136. If at step 134 it is determined that the fault cell has been found, the inference engine 28 then executes the find fault routine 104 with task i equal to 0 by way of step 138.

The find fault routine 104 will now be described with reference to FIG. 15. At step 140, the value of task i is generated by find fault cell routine 102 is read. If at step 142, it is determined that task i equals 0, indicating that a fault cell has been found, the blackboarder-knowledge cell routine is called at step 144 which constructs the complete knowledge cell on the blackboard 34. In doing so, the find fault routine 104 passes to the blackboarder-knowledge cell routine information regarding the name of the fault cell and taxonomical piece in which the fault cell is located.

After executing step 144, or if at step 142 task i does not equal zero, step 146 is executed which calls the cell internal control heuristic. As described below, the cell internal control heuristic is used for isolating a fault in the fault cell. In executing step 146, the find fault routine 104 passes to the cell internal heuristic the name of the taxonomical piece in which the knowledge cell is located, the name of the fault cell, and the value of task i.

If the cell internal control heuristic succeeds in isolating the fault within the fault cell, there is no need to construct another cyber transition sequence. Accordingly, the inference engine 28 then calls the find fault cell routine 102 at steps 148 and 150 of the find fault routine 104. In this case, the find fault cell routine 102 will either decompose the current fault cell if it is a composite cell by leveling down (i.e., TT=0), or will terminate diagnosis with an "F-cell ignorance" signal at step 112. If the cell internal control heuristic does not fault isolate, and indicates that a new cyber transition sequence must be generated, the find fault cell routine 102 is called at step 152. When this occurs, the value of TT is set equal to zero to indicate that an excursion departure will occur in indicating that the fault of the knowledge is due to a fault in another cyber.

The blackboarder-taxonomy cell routine will now be described with reference to FIG. 16. The blackboarder-taxonomy routine, generally designated by the numeral 154, has an initial step 156 in which both the name of the taxonomical piece under consideration and the test message number associated with the taxonomical piece are read. At step 158, it is determined whether the particular taxonomical piece under consideration is on the blackboard 34. If it is not on the blackboard 34, step 160 is executed which retrieves the taxonomical piece from the taxonomy the boundary files.

After executing step 160, or if at step 158 it is determined that the taxonomical piece is on the blackboard 34, step 162 is executed. At step 162, a test message is retrieved from the test message file and the test message is displayed on the user interface 26. After executing step 162, step 164 is executed which copies the taxonomical piece onto a portion of the blackboard 34. Control is then returned to the calling step at return step 166.

Figure 17:
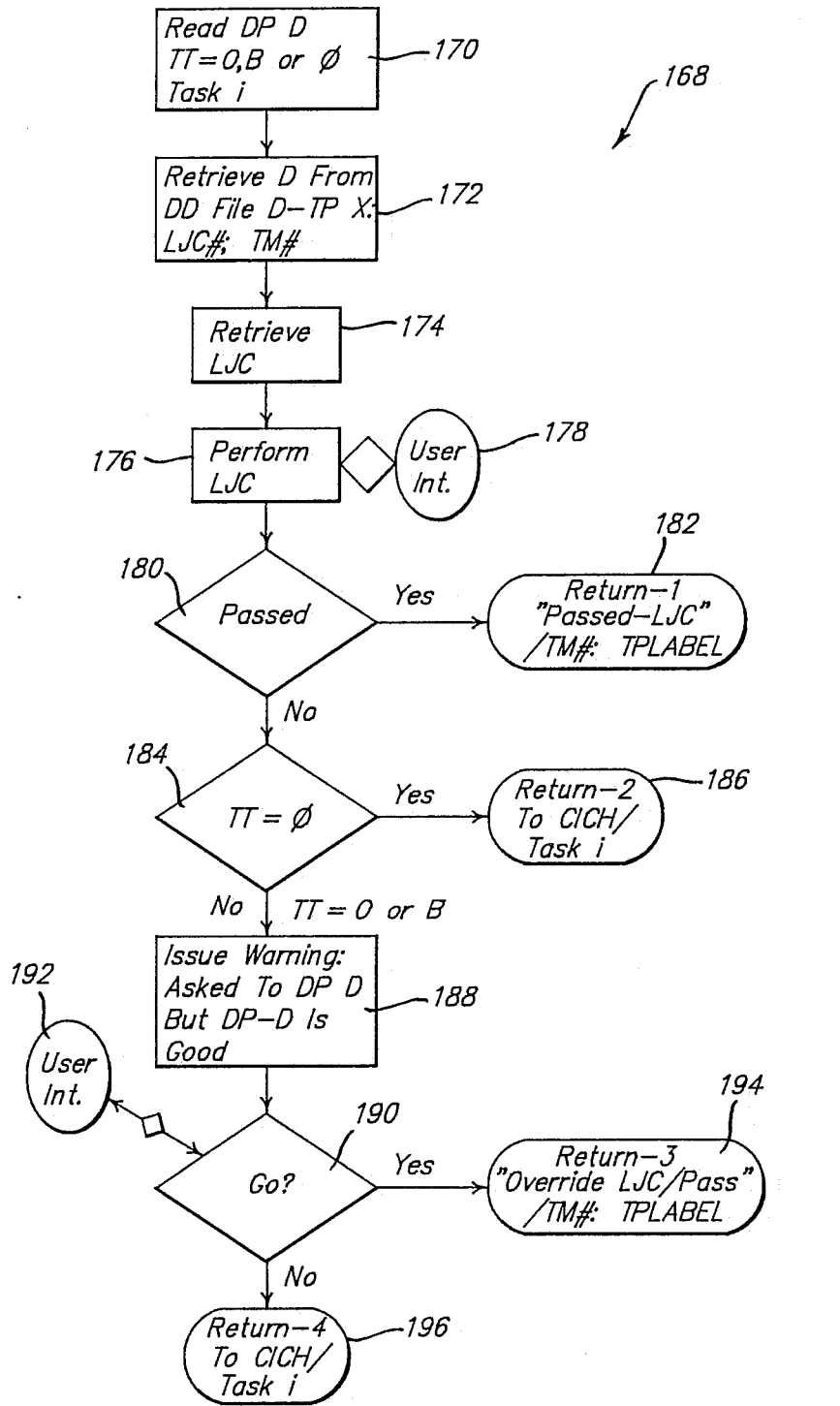
FIG. 17 is a flow chart representing the leveler instruction routine used by the inference engine.

The leveler-instruction routine will now be described with reference to FIG. 17. The leveler-instruction routine, generally designated by the numeral 168, comprises an initial step 170 which reads the name of the current determinant piece D, the value of TT, and the value of task i. At step 172, the determinant piece is retrieved from the determinant directory file together with the name of the determinant piece, the level jump condition number, and the test message number. At step 174, the level jump condition are retrieved from the level jump conditions file. At step 176, a level jump condition is performed in which the user is instructed to perform a test at user interface step 178. If the level jump condition is passed as determined at step 180, step 182 is executed which instructs the inference engine 28 to execute step 128 of the find fault cell routine 102. In doing so, step 182 passes an indication that the level jump condition was passed, and passes information regarding the test message number and the label of the taxonomical piece under consideration to the find fault cell routine 102.

If at step 180, it is determined that the level jump condition was not passed, it is determined whether the find fault routine 104 instructed the find fault cell routine 102 to level down (i.e., whether the value of TT=0). If at step 184 it is determined that the find fault routine 104 requested the find fault cell routine 102 to level down, step 186 is executed which instructs the inference engine 28 to execute step 126 of the find fault cell routine 102.

If at step 184 it is determined that the find fault routine 104 did not instruct the find fault cell routine 102 to level down, step 188 is executed. At step 188, a warning is issued to the user that the find fault cell routine 102 was asked to determine whether a particular determinant piece contains a fault, but the find fault routine 104 has already determined that the particular determinant piece did not contain a fault.

Step 190 is then executed in which the user is asked at step 192 whether the diagnosis should continue. If the user instructs the leveler-instruction routine 168 to continue, step 194 is then executed which causes the inference engine 28 to execute step 128 of the find fault cell routine 102. In doing so, the step 194 indicates to step 128 that the level jump condition was passed by override, and passes information regarding the taxonomical piece label and the test message number. If the user decides to terminate the diagnostic session after a warning has issued at step 188, step 196 is executed which instructs the inference engine 28 to execute step 126 of the find fault cell routine 102.

Figure 18:
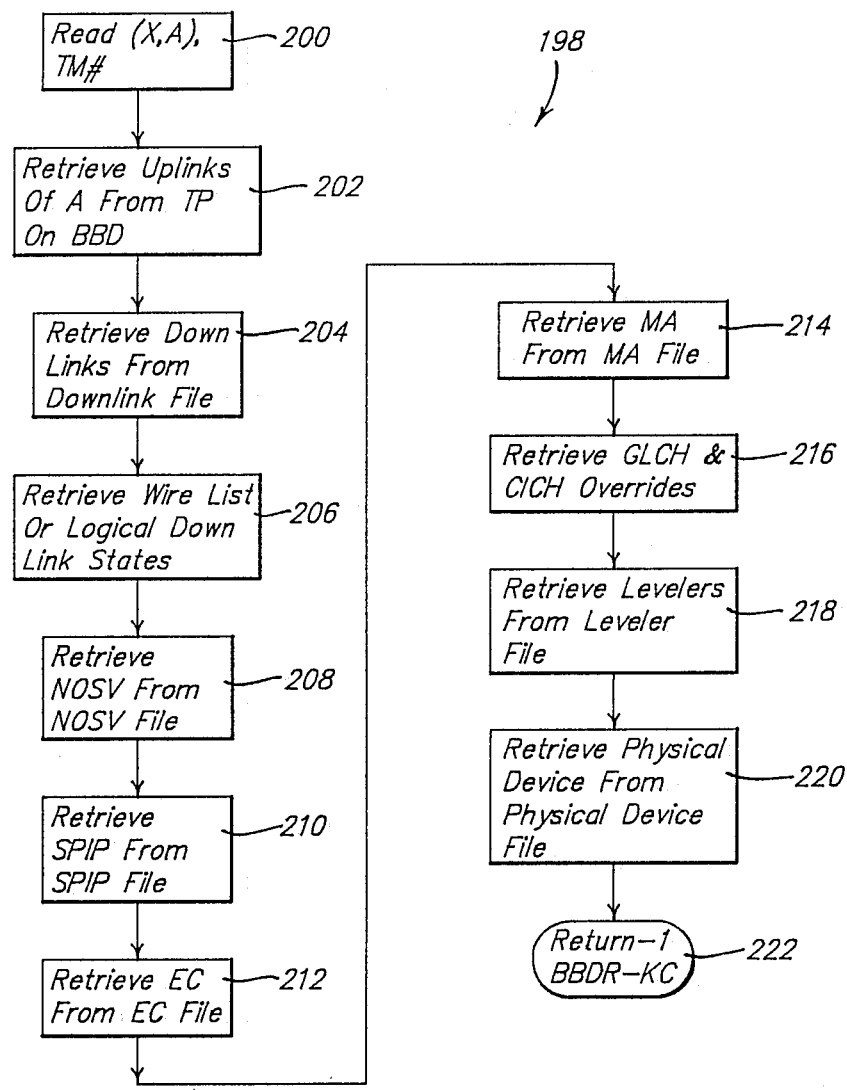
FIG. 18 is a flow chart representing the blackboarder-knowledge cell routine used by the inference engine.

The blackboarder-knowledge cell routine will now be described with reference to FIG. 18. The blackboarder-knowledge cell routine, generally designated by the numeral 198, starts at step 200 wherein the identification of the current taxonomical piece and current knowledge cell in the taxonomical piece is read. In addition, the test message number associated with the taxonomical piece and the knowledge cell is also read. At step 202, uplinks associated with the knowledge cell are retrieved from the taxonomical piece. At step 204, the downlinks from the downlink file associated with the knowledge cell. After executing step 204, step 206 is executed in which the wire lists or logical downlink states associated with the knowledge cell are retrieved. At step 208 the normal operating state values associated with the knowledge cell are retrieved from the normal operating state values file.

Step 210 is then executed which retrieves information regarding special probe/inspection procedure data of the knowledge cell from the special probe/inspection procedure file. At step 212, enablement conditions associated with the knowledge cell are retrieved from the enablement conditions file. Step 214 is then executed which retrieves all maintenance actions regarding the knowledge cell from the maintenance actions file. At step 216, override conditions of the global control heuristic and the cell internal control heuristic are retrieved. At step 218, levelers associated with the knowledge cell are retrieved from the leveler file. Step 220 is then executed which retrieves physical device information associated with the knowledge cell from the physical device file. The inference engine 28 then executes step 128 of the find fault cell routine 102 by way of return step 222.

Figure 19A:
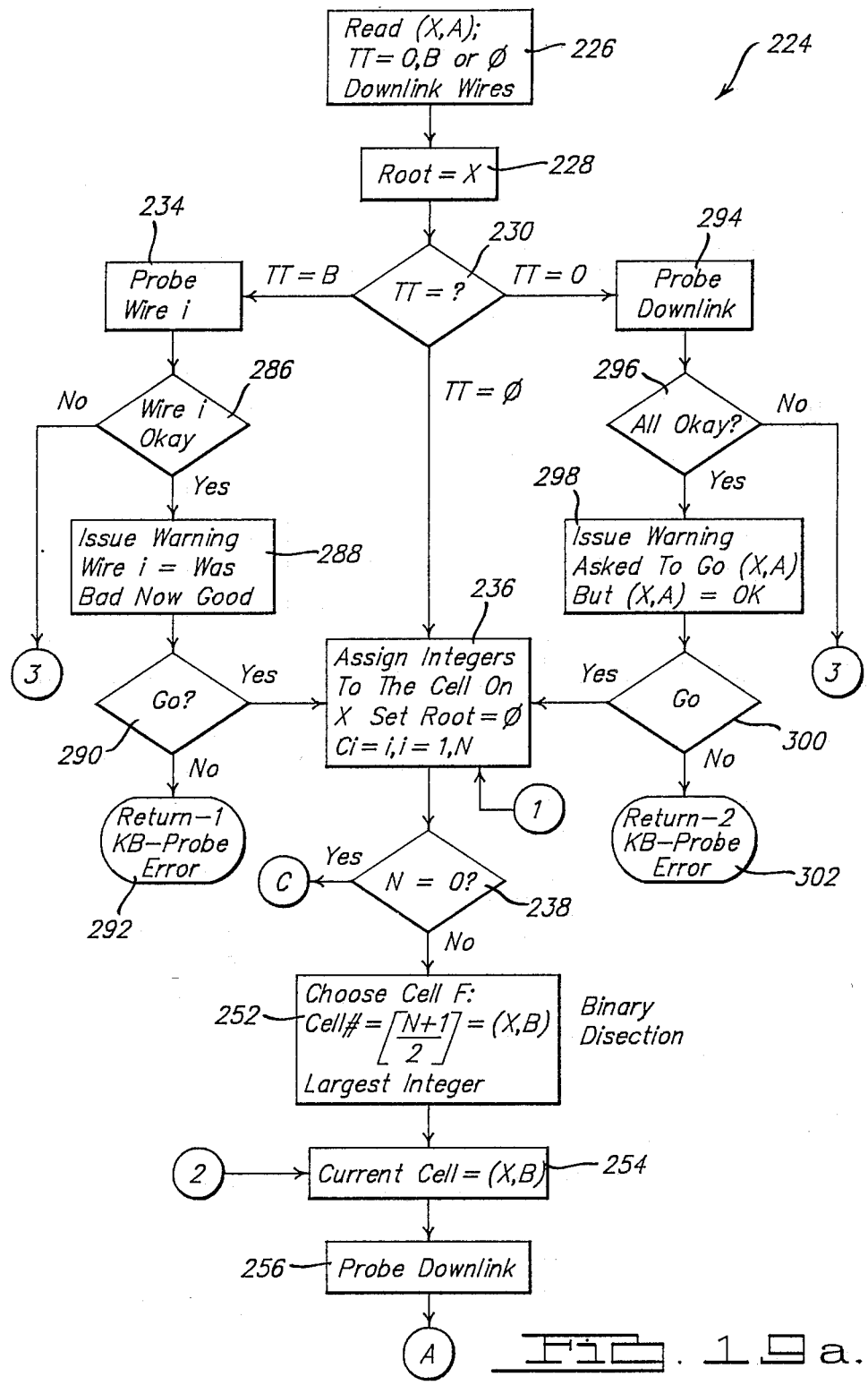
FIGS. 19a-c is a flow chart which represents the global control heuristic routine used by the inference engine.
Figure 19B:
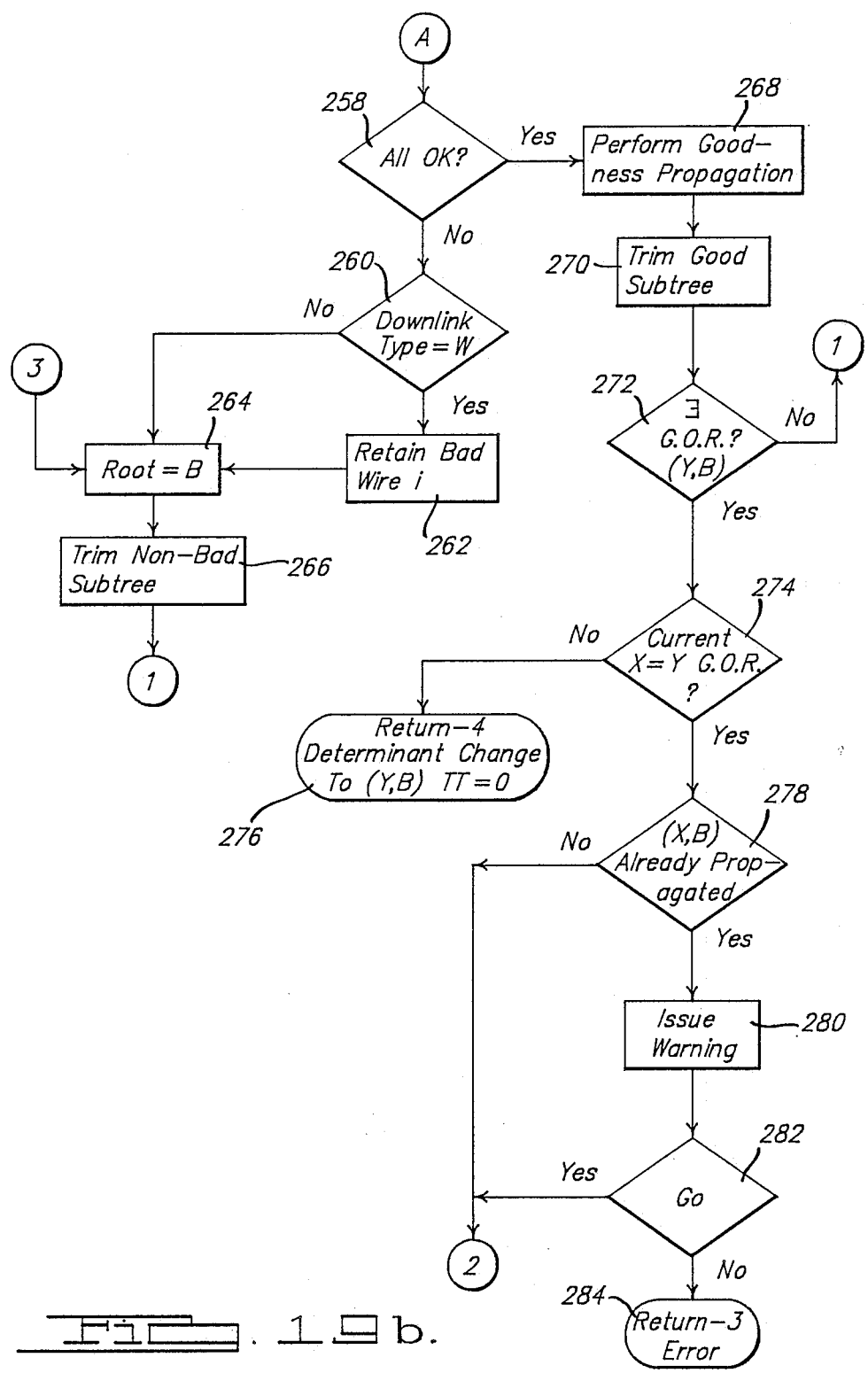
Figure 19C:
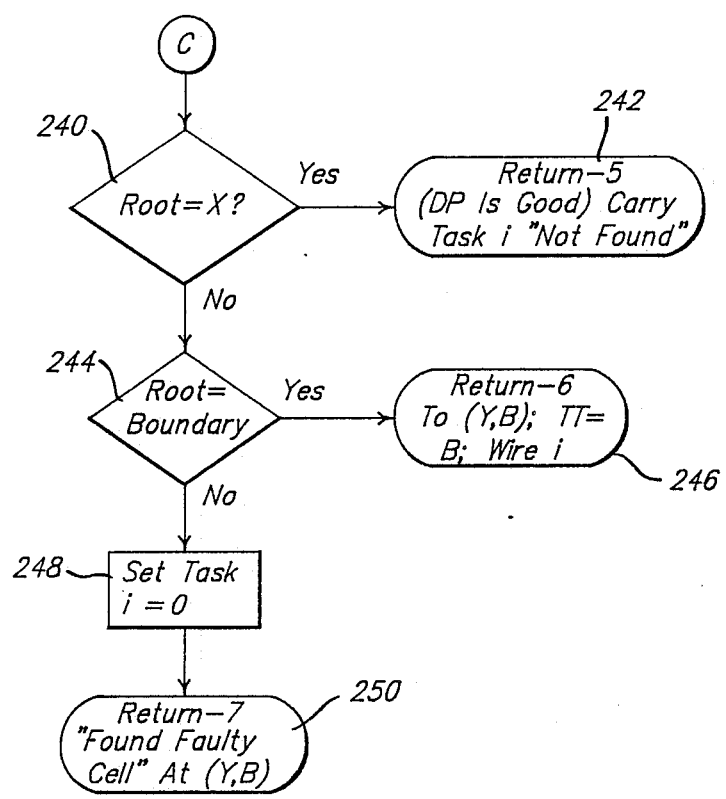

The global control heuristic will be described with reference to FIGS. 19a–c. The global control heuristic, generally designated by the numeral 224, starts at step 226 which reads the name of the particular knowledge cell in question, the associated taxonomical piece and the value of TT and downlink wires. Step 228 is then executed in which a variable ROOT is set equal to the given taxonomical piece. At step 230, the present value of TT is determined. If the value of TT equals 0 indicating that the find fault cell routine 102 was executed due to an override condition, step 232 described below is executed. If at step 230, it is determined that the value of TT is equal to B thereby indicating that the find fault cell routine 102 was accessed through a boundary cell, step 234 described below is executed.

If at step 230, it is determined that the value of TT=0 thereby indicating that the find fault cell routine 102 was accessed through a leveling down condition, step 236 is executed. At step 236, all knowledge cells in the taxonomical piece are assigned integer values from 0 to N, where zero is always assigned to the ROOT cell. After executing step 236, step 238 determines whether the value of N equals zero. If the value of N equals zero, at step 240, it is determined whether ROOT has changed during processing. If the ROOT has not changed during processing, this indicates that the determinant piece does not contain a knowledge cell with a fault, and step 242 causes the inference engine 28 to execute step 136 of the find fault cell routine 102.

If at step 240, it is determined that ROOT has changed during processing, step 244 is executed which determines whether ROOT represents a boundary cell. If ROOT represents a boundary cell, the inference engine 28 is instructed to review a different knowledge cell in a different taxonomical piece. In doing so, the inference engine 28 sets the value of TT=B, as well as identifies wire i which is the downlink of the boundary cell whose output is abnormal. The global control heuristic 224 then instructs the inference engine 28 to execute step 122 of the find fault cell routine 102 at step 246.

If at step 244, it is determined that ROOT does not represent a boundary cell, step 248 sets task i equal to zero which indicates that the fault cell has been found. The global control heuristic 224 then instructs the inference engine 28 to execute step 138 of the find fault cell routine 102 at return step 250.

If at step 238, it is determined that the value of N does not equal zero, step 252 is executed, wherein integers assigned in step 238 are binary-dissected, rounding upward if necessary. For purposes of this discussion, it will be assumed that the knowledge cell whose assigned integer number is in the middle of the binary dissection is knowledge cell B which is located in taxonomical piece X. After executing step 252, step 254 assigns a value to the knowledge cell under consideration equal to the value of knowledge cell B derived from the binary dissection. After executing step 254, step 256 probes the downlink associated with knowledge cell B.

Step 258 is then executed which determines whether the outputs associated with the knowledge cell B are normal. If it is determined that the outputs associated with knowledge cell B are not at their appropriate levels, step 260 is executed which determines whether the downlink which was abnormal was a logical type or wire type downlink. If it is determined at step 260 that the downlink was a wire type downlink, step 262 retains information concerning the wire that had a faulty output. After executing step 262, or if at step 260 it is determined that the downlink was a logical type, step 264 is executed in which the value of ROOT is set equal to B. After executing step 264, step 266 eliminates those knowledge cells which do not have faulty outputs. After executing step 266, a decision is made at step 236.

If at step 258, the downlinks do not indicate that the current knowledge cell is faulty, step 268 is executed, which indicates if the current knowledge cell, as well as all knowledge cells which provide outputs to the current knowledge cell are not faulty. This process is called goodness propagation. After goodness propagation occurs at step 268, step 270 is executed, in which knowledge cells which have been determined not to be faulty are eliminated from consideration. After executing step 270, step 272 determines whether there is a global control heuristic override associated with the current knowledge cell. If there is no global control heuristic override step 238 is executed.

If at step 272, it is determined that there exists a global control heuristic override associated with the current knowledge cell, step 274 is executed which determines whether the determinant piece to which the global control heuristic override is directed is the current determinant piece. If it is not, step 276 changes the determinant piece to that which was the subject of the global control heuristic override by instructing the inference engine 28 to execute step 126 of the find fault cell routine 102.

If it is determined that the current determinant piece is the same as the determinant piece to which the global control heuristic override is directed, step 278 determines whether goodness propagation has been performed on the current knowledge cell. If it is determined that goodness propagation has already occurred with respect the current knowledge cell, a warning is issued at step 280 to inform the user that the current knowledge cell was already found not to be a fault cell. After executing step 280, the user is asked whether the diagnosis should continue at step 282. If the diagnosis is not to continue, the inference engine 28 is instructed to execute step 128 of the find fault cell routine 102. If the user determines at step 282 that the diagnosis should continue, or at step 278 it is determined that goodness propagation has not occurred with respect to the current knowledge cell, step 284 is executed.

If at step 230, the value of TT is found to be equal to B, which indicates that the find fault cell routine 102 was accessed through a boundary cell, the user is asked to probe wire i at step 286. If it is determined that the output of wire i is abnormal, step 264 is executed at step 286. If the output from wire i is normal, step 288 is executed which issues a warning to the user that, while the present output wire i is normal, its past output was abnormal. If the user determines that diagnosis should continue, step 236 is executed by means of step 290. If the user decides diagnosis should be discontinued, diagnostic activity is terminated at step 292 and knowledge base error correction is requested.

If at step 230, it is determined that the value of TT equals 0 thereby indicating a global control heuristic override has occurred, step 294 is executed which probes the downlinks associated with the knowledge cell. If one of the downlinks is abnormal, step 264 is executed by means of step 296. If the downlinks associated with the knowledge cell are normal, step 298 is executed which issues a warning indicating that the global control heuristic 224 was instructed to examine a knowledge cell for a fault but the knowledge cell has been determined not to be faulty. If the user decides to continue with the diagnosis, step 236 is executed by means of step 300. If the user decides to terminate diagnosis, diagnostic activity is terminated at step 302 and knowledge base error correction is requested.

Figure 20A:
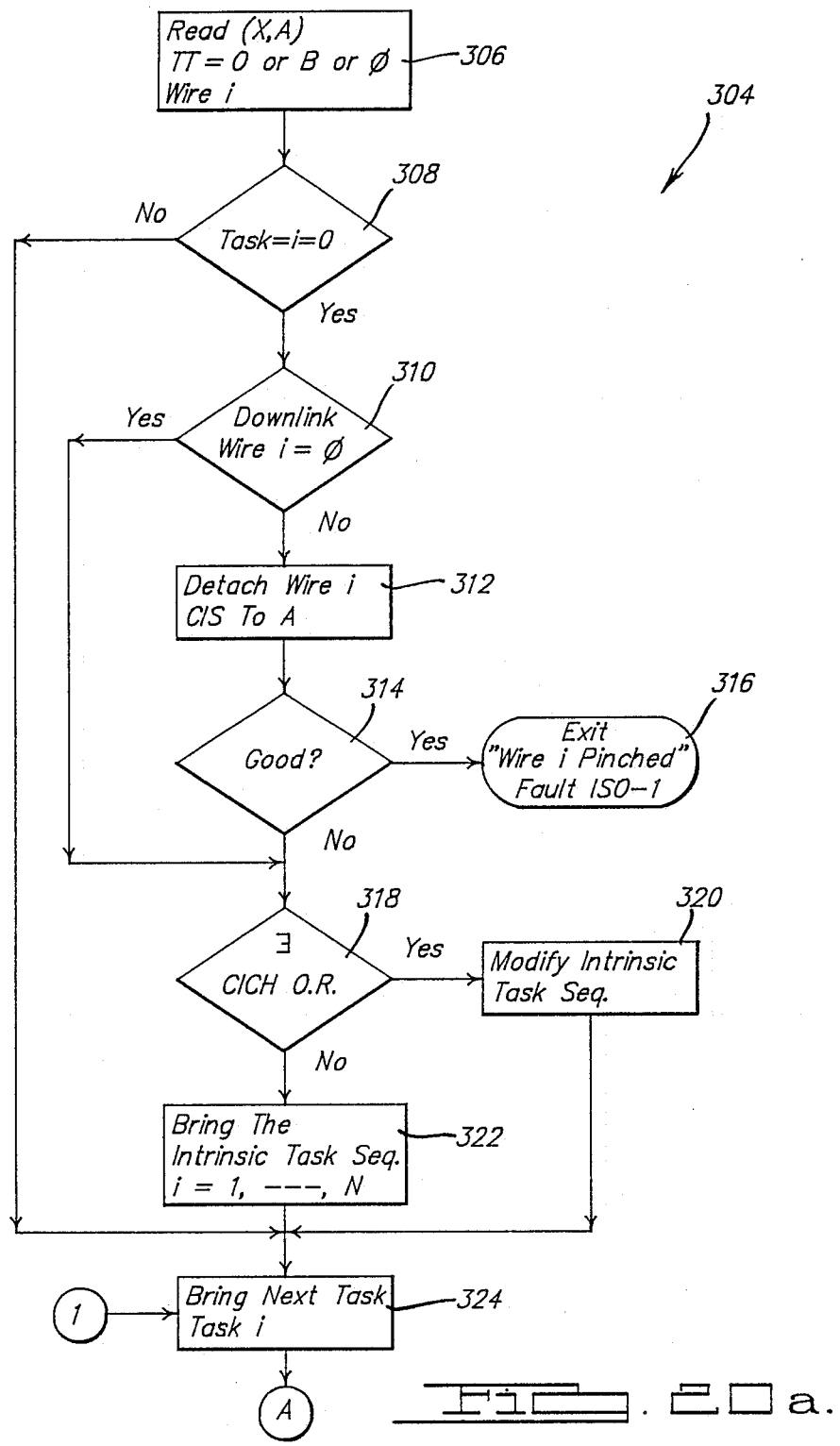
FIGS. 20a-c is a flow chart representing the cell internal control heuristic routine used by the inference engine.
Figure 20B:
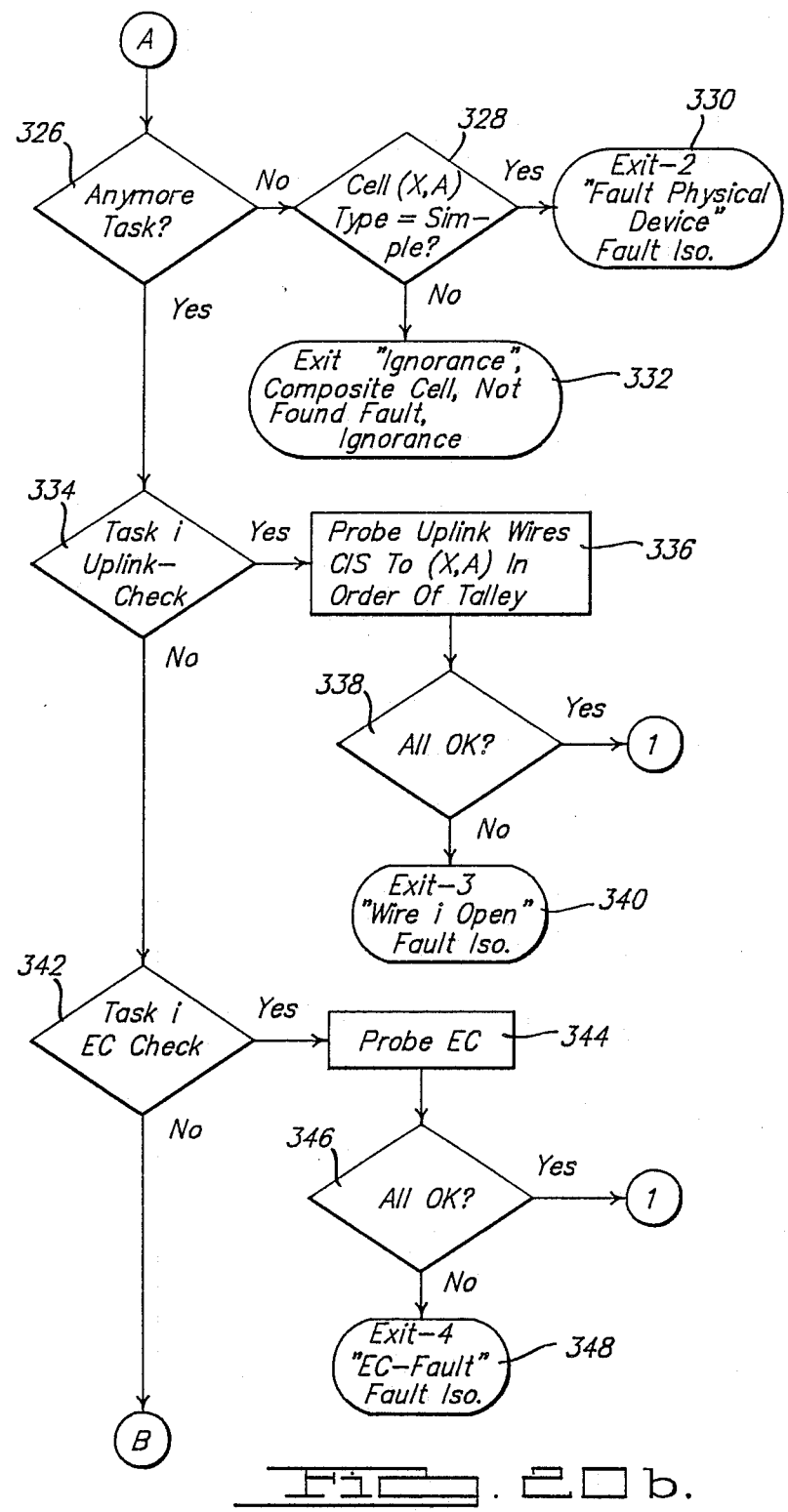
Figure 20C:
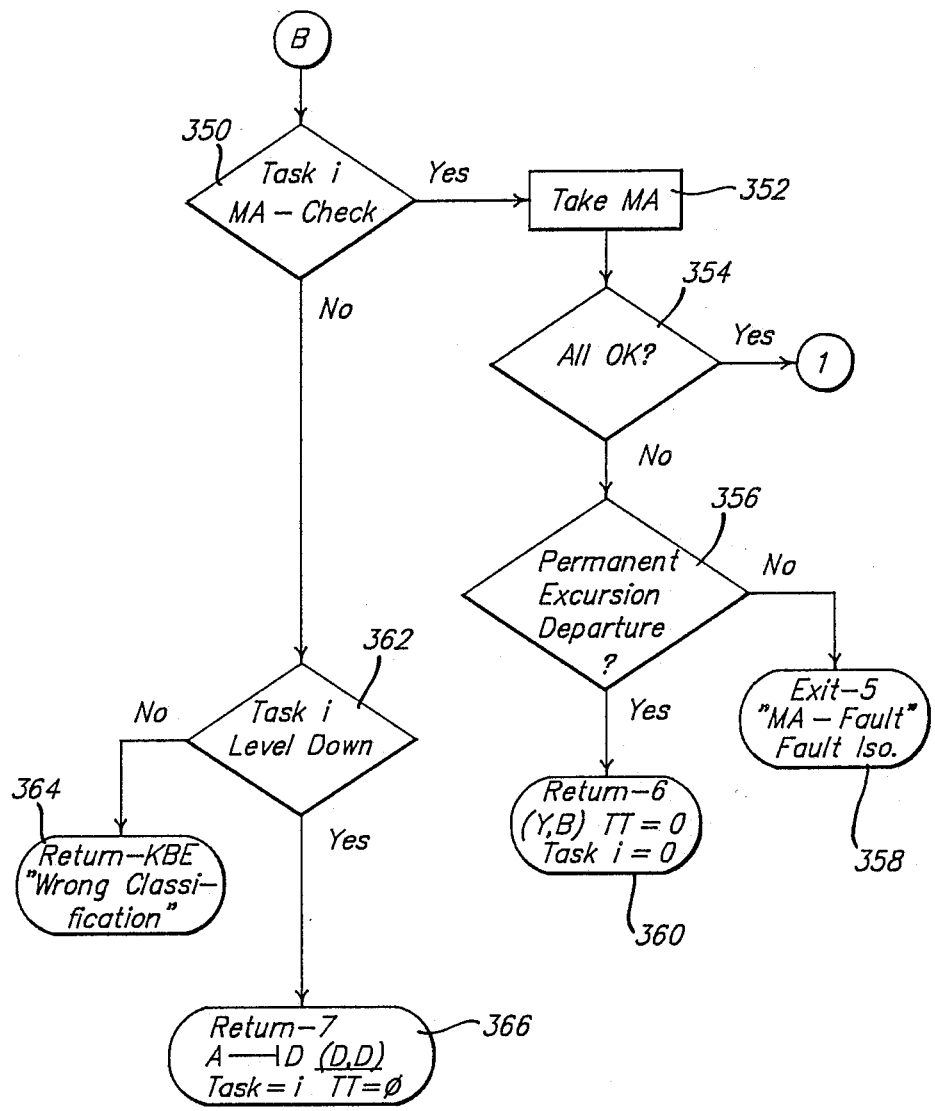

The cell internal control heuristic will now be described with respect to FIGS. 20a-c. The cell internal control heuristic, generally designated by the numeral 304, starts at step 306 in which the current knowledge cell, together with its taxonomical piece, the value of TT, and the wire i are read. Step 308 is then executed which determines whether the value of task i is equal to zero. If the value of task i is equal to zero, step 310 is executed which determines whether the downlink of wire i is equal to zero, indicating that the downlink is a wire type. If at step 310 it is determined that the downlink of wire i is not equal to zero, step 312 is executed which instructs the user to detach the wire connected to the substrate represented by the knowledge cell A.

After executing step 312, the user is then asked at step 312 whether output is normal after the wire i has been detached. If the user indicates that a normal output has appeared, step 316 provides a message that indicates that the wire i has been pinched and that isolation has occurred. If the output of wire i is not normal, or if at step 310 the downlink of wire i is equal to 0, it is determined at step 318 whether there exists a cell internal control heuristic override associated with the knowledge cell. If such an override exists, step 320 is executed. If no cell internal control heuristic override exists, step 322 is executed in which the sequence of tasks to be exhausted are selected.

After executing step 322, or after modifying the intrinsic task sequence at step 230, or if at step 308 it is determined that the task i does not equal 0, step 324 is executed, which brings in the next task as task i. After executing step 324, it is determined at step 326 whether there are any more tasks to consider. If there are no more tasks to consider, step 328 determines whether the knowledge cell is simple. If it is, step 330 is executed which indicates that the fault appears in the particular physical device and that fault isolation has occurred. If the cell is not simple, step 332 is executed which terminates diagnosis with an ignorance condition indicating that the composite cell has not been found to contain a fault.

If at step 326, it is determined that there are more tasks to consider in the diagnosis, step 334 determines whether task i is an uplink check. If it is determined that task i is an uplink check, step 336 ask the user to measure the output of the wire leading to the substrate represented by the knowledge cell A in order of talley (i.e., which is determined by the inference engine 28 as having the highest probability of failure).

Next, it is determined whether the outputs from the uplink wires of the knowledge cell under examination are normal at step 338. If all the outputs are normal, step 324 is executed. If at step 338 the outputs from the uplink wires associated with the current knowledge cell are abnormal, step 340 is executed in which an open wire fault is indicated.

If at step 334 the task i does not represent an uplink check, step 342 determines whether the task i represents an enablement conditions check. If task i represents an enablement conditions check, the enablement conditions are probed at step 344. After the enablement conditions are probed, it is determined at step 346 whether all the enablement conditions are normal. If all the enablement conditions are normal, step 324 is executed. If at step 346 it is determined that not all the enablement conditions probed are normal, step 348 is executed which indicates that an enablement conditions fault has occurred and that the fault has been isolated.

If at step 342, it is determined that task i does not represent an enablement conditions check, step 350 is executed, which determines whether task i represents a maintenance actions check. Step 352 requests the user to take the appropriate maintenance action. If the user indicates in step 354 that all maintenance actions have been taken, step 324 is executed. If all maintenance action have not been taken, step 356 determines whether there has been a permanent excursion departure (i.e., that the inference engine 28 should examine a different cyber). If there has been no permanent excursion departure, a maintenance actions fault is indicated and diagnosis is terminated at step 358. If at step 356 it is determined that there has been a permanent excursion departure, step 360 is executed in which the inference engine 28 causes execution of step 152 by way of step 360.

If at step 350 it is found that task i does not represent a maintenance action check, step 362 determines whether take i represents a level down condition. If it does, step 36 causes the inference engine 28 to execute step 150. If task i does not represent a level down condition, step 366 instructs the find fault cell routine 102 to level down.

It should be understood that while the present invention was described in connection with one specific embodiment, other modifications will become apparent to one skilled in the art upon a study of the specification, drawings and following claims.

What is claimed is:

1. An expert system for diagnosing faults in equipment, said system including a computer having a memory for storing diagnostic routines and a user interface that permits communication between the expert system and an operator, said system comprising:

a knowledge base coupled to the computer for storing data that is defined by a plurality of files that characterize the physical, functional and operational relationships of the components and between components of the equipment and information concerning selected operating conditions of the equipment, said files containing data indicative of the following attributes of the equipment: (1) the function of each component, (2) a wire list indicating outputs and interconnection of a component to other components of the equipment, (3) a level jump condition indicator which indicates whether a component may be decomposed into a plurality of other components, (4) a test message representing a stimulus applied to generate outputs that indicates whether a component is faulty, and (5) a listing of normal operating state values for a component indicating when that component is not faulty when the stimulus is applied thereto; and an inference engine that is storable in said memory that interfaces with the knowledge base and the operator by way of the user interface and which comprises recursive diagnostic routines that operate on the data contained in the knowledge base to generate symptom diagnostic rules in response to operator entered symptoms which are indicative of the faults present in the equipment.

2. The expert system of claim 1 which further comprises:

a blackboarder coupled between said knowledge base and said inference engine, for accessing the data stored in the knowledge base and retrieving data necessary for the inference engine to perform its diagnosis.

3. The expert system of claim 1 wherein said knowledge base further comprising files containing enablement conditions required for normal operation of the components of the equipment.

4. The expert system of claim 1 wherein said knowledge base further comprises files containing maintenance actions that may be applied to selected components.

5. The expert system of claim 1, wherein the information stored in said knowledge base comprises a conceptual model of said equipment.

6. The expert system of claim 5, wherein said conceptual model of said equipment comprises the determinant of said equipment.

7. The expert system of claim 6, wherein said determinant is represented as a plurality of nodes.

8. The expert system of claim 7, wherein said nodes comprise a plurality of knowledge cells.

9. The expert system of claim 8, wherein each of said knowledge cells is of a type selected from the group consisting of a blank cell, a regular cell, a simple cell, a composite cell, a logical cell and a boundary cell.

10. The expert system of claim 9, wherein said determinant is further represented by a plurality of connectors disposed between said knowledge cells.

11. The expert system of claim 10, wherein said connectors are selected from the group consisting of a link connector, a leveler connector, an excursion connector, and a blank edge connector.

12. The expert system of claim 11, wherein said determinant is divided in such a manner as to be globally leveled.

13. The expert system of claim 12, wherein said determinant comprises a plurality of taxonomical pieces each containing at least one knowledge cell, each of said taxonomical pieces being connected to another taxonomical piece by a leveler, the knowledge cells in each of said taxonomical pieces being connected to at least one other knowledge cell by a link.

14. The expert system of claim 8, wherein each of said knowledge cells is uniquely identified by a cyber, and said inference engine includes means for generating a cyber transition sequence.

15. The expert system of claim 14, wherein said means for generating a cyber transition sequence comprises a global control heuristic.

16. The expert system of claim 15, wherein said expert system further comprises a blackboard and means for constructing a portion of said determinant on said blackboard.

17. The expert system of claim 16, wherein said means for constructing a portion of said determinant on said blackboard comprises a blackboarder-taxonomy routine.

18. The expert system of claim 17, wherein said means for constructing a portion of said determinant on said blackboard further comprises a blackboarder-knowledge cell routine.

19. The expert system of claim 16, wherein said inference engine further comprises means for isolating a faulty knowledge cell from the information contained on said blackboard.

20. The expert system of claim 19, wherein said means for isolating a faulty knowledge cell is operable to decompose said knowledge cell when said knowledge cell is composed of other knowledge cells.

21. The expert system of claim 20, wherein said means for constructing a portion of said determinant on said blackboard comprises a blackboarder, said inference engine comprises means for indicating to said blackboarder which portion of said conceptual model to retrieve.

22. The expert system of claim 21, wherein said means for indicating to said blackboarder which portion of said conceptual model to retrieve comprises a leveler instruction routine.

23. The expert system of claim 6, wherein said determinant is represented as a lattice Klein surface.

24. A process for operating a digital computer to enable a user to correct a fault in electronic equipment having a plurality of components, said computer having a memory for storing a knowledge base having a plurality of knowledge cells representing a functional portion of said electronic equipment and comprising a set of normal operating state values associated with said knowledge cells, and means for indicating whether said knowledge cells are decomposable into other knowledge cells, said knowledge cells being grouped into a plurality of taxonomical pieces that form a determinant of said electronic equipment, said process comprising the steps of:

(a) locating a fault in said knowledge cells in said determinant by comparing said normal operating state values of said knowledge cells with test data derived from applying selected inputs to said electronic equipment to generate outputs therefrom;

(b) indicating an ignorance condition and terminating said process if said knowledge cell determined to be faulty has been previously located;

(c) attempting to isolate said fault in said knowledge cell which has been determined to be faulty;

(d) indicating an ignorance condition and terminating said process if said fault is not isolated after repeatedly attempting to isolate said fault a predetermined number of times;

(e) indicating the existence of a fault isolation condition and terminating said process if said fault is isolated; and (f) repeating steps (a) through (e);

whereby the fault in said electronic equipment is isolated by said digital computer to thereby permit the user to correct the fault in said electronic equipment.

25. The process of claim 24, wherein said knowledge cells comprise files containing data indicative of the following attributes: (1) the function of each component of the equipment, (2) a wire list indicating outputs and interconnection of a component of the equipment to other components thereof, (3) a level jump condition indicator which indicates whether a component of the equipment may be decomposed into a plurality of other components, and (4) a test message representing a stimulus applied to generate outputs that indicates whether a component is faulty.

26. The process of claim 25, wherein said step of examining said knowledge cells in said determinant comprises the step of instructing a blackboarder to obtain a portion of a composite model of said electronic equipment contained in said knowledge base and place said portion of said composite model on a blackboard.

27. The process of claim 26, wherein said step of instructing a blackboarder to obtain a portion of said conceptual model comprises the step of executing a leveler instruction routine.

28. The process of claim 27, wherein said step of examining said knowledge cells in said determinant comprises the step of accessing sad knowledge base and constructing a taxonomical piece on said blackboard.

29. The process of step 28, wherein said step of accessing said knowledge in said knowledge base and constructing a taxonomical piece on said blackboard comprises the step of executing a blackboarder-taxonomy routine.

30. The process of claim 29, wherein said step of examining said knowledge cell in said determinant comprises the step of generating a cyber transition sequence.

31. The process of claim 30, wherein said step of generating a cyber transition sequence comprises the step of executing a global control heuristic.

32. The process of claim 31, wherein said step of attempting to isolate said fault in said knowledge cell comprises the step of accessing said knowledge base to construct said knowledge cell on said blackboard.

33. The process of claim 32, wherein said step of accessing said knowledge base to construct said knowledge cell on said blackboard comprises the step of executing a blackboarder-knowledge cell routine.

34. The process of claim 32, wherein said step of attempting to isolate said fault in said knowledge cell comprises the step of decomposing said knowledge cell when said knowledge cell is composed of other knowledge cells.

35. The process of claim 34, wherein said step of decomposing said knowledge cell comprises the step of executing a cell internal control heuristic.

* * * * *